(12) United States Patent
Itoh et al.

(10) Patent No.: US 8,390,606 B2
(45) Date of Patent: Mar. 5, 2013

(54) DISPLAY DEVICE, METHOD FOR MANUFACTURING SAME, AND ACTIVE MATRIX SUBSTRATE

(75) Inventors: Ryohki Itoh, Osaka (JP); Takaharu Yamada, Osaka (JP); Isao Ogasawara, Osaka (JP); Takashi Okamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 215 days.

(21) Appl. No.: 13/054,100

(22) PCT Filed: Jul. 9, 2009

(86) PCT No.: PCT/JP2009/003216
§ 371 (c)(1),
(2), (4) Date: Jan. 14, 2011

(87) PCT Pub. No.: WO2010/041361
PCT Pub. Date: Apr. 15, 2010

(65) Prior Publication Data
US 2011/0122105 A1    May 26, 2011

(30) Foreign Application Priority Data
Oct. 7, 2008 (JP) .................................. 2008-260880

(51) Int. Cl.
*G09G 5/00* (2006.01)
(52) U.S. Cl. ............. 345/204; 345/87; 345/205; 349/56
(58) Field of Classification Search .................... 345/55, 345/87, 90, 92, 204, 205; 349/56, 73
See application file for complete search history.

(56) References Cited

U.S. PATENT DOCUMENTS
5,729,309 A * 3/1998 Na et al. ...................... 349/54
(Continued)

FOREIGN PATENT DOCUMENTS
JP    11-064876 A    3/1999
JP    11-160677 A    6/1999
(Continued)

OTHER PUBLICATIONS

English translation of Official Communication issued in corresponding Russian Patent Application No. 2010154093, mailed on Jul. 9, 2009.

(Continued)

*Primary Examiner* — Joe H Cheng
(74) *Attorney, Agent, or Firm* — Keating & Bennett, LLP

(57) ABSTRACT

A display device includes: a plurality of display interconnects (3) provided so as to extend parallel to each other; a drive circuit (44*aa*) provided at one ends of the display interconnects (3), and connected to the display interconnects (3); a first interconnect (Wa) provided so as to cross the other ends of the display interconnects (3) in an insulating state; and a second interconnect (Wb) provided so as to cross the one ends of the display interconnects (3) in an insulating state, and so as to be connected to the first interconnect (Wa). When any of the display interconnects (3) is disconnected, a display signal from the drive circuit (44*aa*) is supplied to the other side of the disconnected display interconnect (3) sequentially through the second interconnect (Wb) and the first interconnect (Wa) in this order via an amplifier circuit (A). The second interconnect (Wb) is configured so that the display signal from the drive circuit (44*aa*) is supplied to the first interconnect (Wa) via a plurality of paths (Pa, Pb) that are different from each other.

27 Claims, 21 Drawing Sheets

U.S. PATENT DOCUMENTS

| | | | |
|---|---|---|---|
| 5,859,679 A * | 1/1999 | Song | 349/54 |
| 6,111,558 A * | 8/2000 | Jeung et al. | 345/93 |
| 6,525,705 B1 | 2/2003 | Ishii et al. | |
| 6,531,996 B1 * | 3/2003 | Murade | 345/98 |
| 7,394,508 B2 * | 7/2008 | Chen et al. | 349/54 |
| 7,482,187 B2 * | 1/2009 | Shibusawa | 438/29 |
| 7,532,271 B2 * | 5/2009 | Hsu et al. | 349/54 |
| 8,023,058 B2 * | 9/2011 | Han et al. | 349/54 |
| 2003/0103045 A1 | 6/2003 | Shiraishi | |
| 2003/0179158 A1 * | 9/2003 | Sakaki | 345/55 |
| 2004/0012727 A1 * | 1/2004 | Kim et al. | 349/54 |
| 2004/0017531 A1 * | 1/2004 | Nagata et al. | 349/139 |
| 2005/0168491 A1 * | 8/2005 | Takahara et al. | 345/690 |
| 2005/0263772 A1 * | 12/2005 | Park | 257/72 |
| 2007/0200965 A1 | 8/2007 | Okawa et al. | |
| 2007/0285595 A1 | 12/2007 | Hirao | |
| 2009/0115959 A1 * | 5/2009 | Lee et al. | 349/192 |
| 2011/0134089 A1 * | 6/2011 | Ozeki et al. | 345/205 |

FOREIGN PATENT DOCUMENTS

| | | |
|---|---|---|
| JP | 2000-321599 A | 11/2000 |
| JP | 2003-202846 A | 7/2003 |
| JP | 2004-004492 A | 1/2004 |
| JP | 2006-235056 A | 9/2006 |
| JP | 2007-010900 A | 1/2007 |
| JP | 2007-047277 A | 2/2007 |
| JP | 2008-058337 A | 3/2008 |
| KR | 10-2007-0005670 A | 1/2007 |
| KR | 10-2007-0114863 A | 12/2007 |

OTHER PUBLICATIONS

Official Communication issued in International Patent Application No. PCT/JP2009/003216, mailed on Oct. 13, 2009.

* cited by examiner

DISPLAY DEVICE, METHOD FOR MANUFACTURING SAME, AND ACTIVE MATRIX SUBSTRATE

TECHNICAL FIELD

The present invention relates to display devices, methods for manufacturing the same, and active matrix substrates, and more particularly to techniques of repairing disconnections of display interconnects arranged in active matrix substrates and display devices.

BACKGROUND ART

Liquid crystal displays (LCDs) include, e.g., an active matrix substrate and a counter substrate that are positioned so as to face each other. This active matrix substrate includes as display interconnects, e.g., a plurality of gate lines provided so as to extend parallel to each other, and a plurality of source lines provided so as to extend parallel to each other in a direction perpendicular to the gate lines. Thus, if any of the display interconnects such as the gate lines and the source lines is disconnected in the LCDs having such an active matrix substrate, a display signal from a drive circuit is not supplied to the part of the display interconnect located beyond the disconnected position, whereby display quality is significantly reduced.

In order to solve this problem, various LCDs have been proposed which include, outside a display region for displaying an image, an interconnect for repairing disconnections, and an amplifier circuit provided on the interconnect (see, e.g., Patent Documents 1-3).

CITATION LIST

Patent Document

PATENT DOCUMENT 1: Japanese Patent Publication No. H11-160677
PATENT DOCUMENT 2: Japanese Patent Publication No. 2000-321599
PATENT DOCUMENT 3: Japanese Patent Publication No. 2008-58337

SUMMARY OF THE INVENTION

Technical Problem

FIG. 21 is a plan view of a conventional LCD 150 corresponding to an LCD shown in FIG. 1 of Patent Document 1.

As shown in FIG. 21, the LCD 150 includes: a liquid crystal display (LCD) panel 140; two source-side tape carrier packages (TCPs) 141a attached to the upper end of the LCD panel 140 in the figure; a gate-side TCP 141b attached to the left end of the LCD panel 140 in the figure; a source-side printed wiring board (PWB) 145a attached to the upper ends of the source-side TCPs 141a in the figure; a gate-side PWB 145b attached to the left end of the gate-side TCP 141b in the figure; and a flexible printed circuit (FPC) 141c attached to the left end of the source-side PWB 145a and the upper end of the gate-side PWB 145b in the figure.

As shown in FIG. 21, the LCD panel 140 includes, in a display region D for displaying an image, a plurality of source lines 103 provided so as to extend parallel to each other, and a plurality of gate lines (not shown) provided so as to extend parallel to each other in a direction perpendicular to the source lines 103. The plurality of source lines 103 are divided into a plurality of blocks Ba, Bb, and the source lines 103 in the blocks Ba, Bb are connected to source drivers 144a on the TCPs 141a are provided in each block Ba, Bb.

As shown in FIG. 21, the LCD 150 further includes two first interconnects Wa and two second interconnects Wb. The first interconnects Wa extend along the lower side of the LCD panel 140 in the figure so as to cross the lower ends of the source lines 103 in the figure, and extend along the upper side of the source-side PWB 145a in the figure via the gate-side TCP 141b, the gate-side PWB 145b, and the FPC 141c. The second interconnects Wb are provided in an L shape in each block Ba, Bb of the LCD panel 140 so as to cross the upper ends of the source lines 103 in a region outside the display region D, and so as to be connected to the first interconnects Wa on the source-side PWB 145a by soldering. As shown in FIG. 21, in the source-side PWB 145a, amplifier circuits A are provided in the left ends of the first interconnects Wa in the figure.

In the LCD 150 having the above configuration, if the source line 103 is disconnected at a position X as shown in FIG. 21, the intersection Ma of the lower part of the disconnected source line 103 and the outer first interconnect Wa in the figure, and the intersection Mb of the upper part of the disconnected source line 103 and the right second interconnect Wb in the figure are irradiated with laser light, and a connection terminal Sb of the right second interconnect Wb is soldered to a right connection terminal Sa in the figure, thereby making an electrical connection between the lower part of the disconnected source line 103 and the outer first interconnect Wa in the figure, an electrical connection between the upper part of the disconnected source line 103 and the right second interconnect Wb in the figure, and an electrical connection between the outer first interconnect Wa and the right second interconnect Wb in the figure. Thus, as shown in FIG. 21, a display signal (a source signal) from the source driver 144a on the TCP 141a is supplied to the part of the source line 103 located below the position X in the figure via the right second interconnect Wb and the outer first interconnect Wa having the amplifier circuit A in the figure. Since the source signal from the source driver 144a is supplied also to the part of the source line 103 beyond the disconnected position (the position X), the disconnection of the source line 103 can be repaired.

However, in the LCD 150 having the above configuration, each of the second interconnects Wb crosses all the source lines 103 in a corresponding one of the blocks, as shown in FIG. 21. Thus, if the source line 103 located at the end (the right end in the figure) of the block is disconnected, and the disconnection is repaired, the source signal is delayed in the part of the repaired source line 103 located beyond the disconnected position due to the electrical resistance of the second interconnect Wb in one block, and the electrical capacitance at the intersections of the second interconnect Wb and the source lines 103 in one block. In this case, the brightness of the pixels along the repaired source line 103 varies due to insufficient charging, whereby these pixels may be visually recognized.

The present invention was developed in view of the above problem, and it is an object of the present invention to reduce a signal delay in a display interconnect in which a disconnection has been repaired.

Solution to the Problem

In order to solve the above object, according to the present invention, a second interconnect crossing one ends of display interconnects is configured so that a display signal from a drive circuit is supplied to a first interconnect crossing the other ends of the display interconnects, via a plurality of paths that are different from each other.

Specifically, a display device according to the present invention includes: a display panel having a plurality of display interconnects provided so as to extend parallel to each other; a drive circuit provided at one ends of the display interconnects, and connected to the display interconnects; a first interconnect provided so as to cross the other ends of the display interconnects in an insulating state; and a second interconnect provided so as to cross the one ends of the display interconnects in an insulating state, and so as to be connected to the first interconnect. The display device is configured so that when any of the display interconnects is disconnected, a display signal from the drive circuit is supplied to the other side of the disconnected display interconnect sequentially through the second interconnect and the first interconnect in this order via an amplifier circuit. The second interconnect is configured so that the display signal from the drive circuit is supplied to the first interconnect via a plurality of paths that are different from each other.

According to the above configuration, the second interconnect crossing the one ends of the display interconnects is configured so that the display signal from the drive circuit provided at the one ends of the display interconnects is supplied to the first interconnect crossing the other ends of the display interconnects, via the plurality of paths that are different from each other. Thus, if the plurality of display interconnects are equally divided into n groups (where n is a natural number of 2 or more) each formed by adjoining ones of the display interconnects, and the paths of the second interconnect are arranged so as to correspond to the n groups of the display interconnects, the electrical resistance of each path of the second interconnect is R/n, and the electrical capacitance at the intersection of each path of the second interconnect and the display interconnect is C/n, whereby the time constant of each path of the second interconnect is $\tau=RC/n^2$, as compared to the case where the second interconnect is provided simply in an L shape (see FIG. 21; the time constant of the second interconnect: $\tau=RC$). The display signal from the drive circuit is supplied to the other side of the disconnected display interconnect sequentially through the second interconnect and the first interconnect in this order via the amplifier circuit. Thus, since the time constant of each path of the second interconnect is reduced as described above, a signal delay in the repaired display interconnect can be reduced.

A display device according to the present invention includes: a display panel having a plurality of display interconnects provided so as to extend parallel to each other; a drive circuit provided at one ends of the display interconnects, and connected to the display interconnects; a first interconnect provided so as to cross the other ends of the display interconnects in an insulating state, and having an amplifier circuit; and a second interconnect provided so as to cross the one ends of the display interconnects in an insulating state, and so as to be connected to the first interconnect. The display device is configured so that when any of the display interconnects is disconnected, a display signal from the drive circuit is supplied to the other side of the disconnected display interconnect sequentially through the second interconnect and the first interconnect in this order. The second interconnect is configured so that the display signal from the drive circuit is supplied to the first interconnect via a plurality of paths that are different from each other.

With the above configuration, the second interconnect crossing the one ends of the display interconnects is configured so that the display signal from the drive circuit provided at the one ends of the display interconnects is supplied to the first interconnect crossing the other ends of the display interconnects, via the plurality of paths that are different from each other. Thus, if the plurality of display interconnects are equally divided into n groups (where n is a natural number of 2 or more) each formed by adjoining ones of the display interconnects, and the paths of the second interconnect are arranged so as to correspond to the n groups of the display interconnects, the electrical resistance of each path of the second interconnect is R/n, and the electrical capacitance at the intersection of each path of the second interconnect and the display interconnect is C/n, whereby the time constant of each path of the second interconnect is $\tau=RC/n^2$, as compared to the case where the second interconnect is provided simply in an L shape (see FIG. 21; the time constant of the second interconnect: $\tau=RC$). The display signal from the drive circuit is supplied to the other side of the disconnected display interconnect sequentially through the second interconnect and the first interconnect in this order via the amplifier circuit. Thus, since the time constant of each path of the second interconnect is reduced as described above, a signal delay in the repaired display interconnect can be reduced.

The plurality of paths may be provided so as to be independent of each other.

With the above configuration, since the plurality of paths of the second interconnect are provided so as to be independent of each other, the second interconnect is specifically divided into the paths.

The amplifier circuit may be contained in the drive circuit.

With the above configuration, since the amplifier circuit is contained in the drive circuit, the number of external substrates that are attached to the display panel can be reduced.

Multiple ones of the amplifier circuit may be contained in the drive circuit, and the first interconnect and the second interconnect may be provided for each of the amplifier circuits.

With the above configuration, since multiple ones of the amplifier circuit are contained in the drive circuit, and the first interconnect and the second interconnect are provided for each of the amplifier circuits, disconnections of the number of display interconnects equal to the number of amplifier circuits can be repaired.

The plurality of display interconnects may be divided into a plurality of blocks each formed by adjoining ones of the display interconnects, and the drive circuit may be provided for each of the blocks.

With the above configuration, since the drive circuit is provided for each of the blocks, disconnections of the display interconnects may be repaired on a block-by-block basis.

The drive circuit may be a single drive circuit.

With the above configuration, since there is one drive circuit, a signal delay tends to occur according to the position of the disconnected display interconnect. However, since the signal delay in the repaired display interconnect is reduced as described above, the operational advantages of the present invention can be effectively provided.

Multiple ones of the amplifier circuit may be contained in the drive circuit, and the first interconnect and the second interconnect may be provided for each of the amplifier circuits.

With the above configuration, since multiple ones of the amplifier circuit are contained in the drive circuit, and the first interconnect and the second interconnect are provided for each of the amplifier circuits, disconnections of the number of display interconnects equal to the number of amplifier circuits can be repaired.

Each of the second interconnects may be provided so that the plurality of paths are independent of each other.

With the above configuration, since each of the second interconnects is provided so that the plurality of paths are independent of each other, the second interconnect is specifically divided into the paths.

Each of the first interconnects may be formed by a first extended interconnect portion and a second extended interconnect portion that are extended in different directions from each other. The first extended interconnect portion may cross one interconnect group that forms the plurality of display interconnects, and the second extended interconnect portion may cross the other interconnect group that forms the plurality of display interconnects.

With the above configuration, each of the first interconnects is formed by the first extended interconnect portion and the second extended interconnect portion that are extended in the different directions from each other. Thus, the electrical resistance and the electrical capacitance in each of the first interconnects are reduced, whereby the signal delay in the repaired display interconnect can be reduced.

The drive circuit may be provided on the display panel, a film substrate may be attached to the display panel, and the first interconnect and the second interconnect may be provided so as to extend through the film substrate.

With the above configuration, since the drive circuit is provided on the display panel, and the first interconnect and the second interconnect are provided so as to extend through the film substrate, the interconnect layout around the drive circuit can be simplified.

A film substrate may be attached to the display panel, the drive circuit may be provided on the film substrate, a printed wiring board may be attached to the film substrate, and the first interconnect and the second interconnect may be provided so as to extend through the film substrate and the printed wiring board.

With the above configuration, since the drive circuit is provided on the film substrate, and the first interconnect and the second interconnect are provided so as to extend through the film substrate and the printed wiring board, the interconnect layout in the film substrate can be simplified.

The drive circuit, the first interconnect, and the second interconnect may be provided on the display panel.

With the above configuration, the drive circuit, the first interconnect, and the second interconnect are provided on the display panel. Thus, for example, the interconnect layout in the film substrate attached to the display panel can be simplified.

A method for manufacturing a display device according to the present invention is a method for manufacturing a display device including a display panel having a plurality of display interconnects provided so as to extend parallel to each other, a drive circuit provided at one ends of the display interconnects, and connected to the display interconnects, a first interconnect provided so as to cross the other ends of the display interconnects in an insulating state, and a second interconnect provided so as to cross the one ends of the display interconnects in an insulating state, and so as to be connected to the first interconnect. When any of the display interconnects is disconnected, a display signal from the drive circuit is supplied to the other side of the disconnected display interconnect sequentially through the second interconnect and the first interconnect in this order via an amplifier circuit. The second interconnect is configured so that the display signal from the drive circuit is supplied to the first interconnect via a plurality of paths that are different from each other. The method includes: a disconnection detecting step of detecting presence of any disconnection in the display interconnects; and a disconnection repairing step of irradiating with laser light an intersection of the other end of the display interconnect having the disconnection detected in the disconnection detecting step and the first interconnect, and an intersection of the one end of the display interconnect and the second interconnect.

In the above method, the second interconnect crossing the one ends of the display interconnects is configured so that the display signal from the drive circuit provided at the one ends of the display interconnects is supplied to the first interconnect crossing the other ends of the display interconnects, via the plurality of paths that are different from each other. Thus, if the plurality of display interconnects are equally divided into n groups (where n is a natural number of 2 or more) each formed by adjoining ones of the display interconnects, and the paths of the second interconnect are arranged so as to correspond to the n groups of the display interconnects, the electrical resistance of each path of the second interconnect is R/n, and the electrical capacitance at the intersection of each path of the second interconnect and the display interconnect is C/n, whereby the time constant of each path of the second interconnect is $\tau=RC/n^2$, as compared to the case where the second interconnect is provided simply in an L shape (see FIG. 21; the time constant of the second interconnect: $\tau=RC$).

In the disconnection repairing step, the intersections of the display interconnect having the disconnection detected in the disconnection detecting step and the first and second interconnects are irradiated with laser light. Thus, the display signal from the drive circuit is supplied to the other side of the display interconnect having the detected disconnection, sequentially through the second interconnect and the first interconnect in this order via the amplifier circuit. Thus, since the time constant of each path of the second interconnect is reduced as described above, a signal delay in the repaired display interconnect can be reduced.

A method for manufacturing a display device according to the present invention is a method for manufacturing a display device including a display panel having a plurality of display interconnects provided so as to extend parallel to each other, a drive circuit provided at one ends of the display interconnects, and connected to the display interconnects, a first interconnect provided so as to cross the other ends of the display interconnects in an insulating state, and having an amplifier circuit, and a second interconnect provided so as to cross the one ends of the display interconnects in an insulating state, and so as to be connected to the first interconnect. When any of the display interconnects is disconnected, a display signal from the drive circuit is supplied to the other side of the disconnected display interconnect sequentially through the second interconnect and the first interconnect in this order. The second interconnect is configured so that the display signal from the drive circuit is supplied to the first interconnect via a plurality of paths that are different from each other. The method includes: a disconnection detecting step of detecting presence of any disconnection in the display interconnects; and a disconnection repairing step of irradiating with laser light an intersection of the other end of the display interconnect having the disconnection detected in the disconnection detecting step and the first interconnect, and an intersection of the one end of the display interconnect and the second interconnect.

In the above method, the second interconnect crossing the one ends of the display interconnects is configured so that the display signal from the drive circuit provided at the one ends of the display interconnects is supplied to the first interconnect crossing the other ends of the display interconnects, via the plurality of paths that are different from each other. Thus, if the plurality of display interconnects are equally divided into n groups (where n is a natural number of 2 or more) each formed by adjoining ones of the display interconnects, and the paths of the second interconnect are arranged so as to correspond to the n groups of the display interconnects, the electrical resistance of each path of the second interconnect is R/n, and the electrical capacitance at the intersection of each path of the second interconnect and the display interconnect is C/n, whereby the time constant of each path of the second interconnect is $\tau=RC/n^2$, as compared to the case where the second interconnect is provided simply in an L shape (see FIG. 21; the time constant of the second interconnect: $\tau=RC$). In the disconnection repairing step, the intersections of the display interconnect having the disconnection detected in the disconnection detecting step and the first and second interconnects are irradiated with laser light. Thus, the display signal from the drive circuit is supplied to the other side of the display interconnect having the detected disconnection, sequentially through the second interconnect and the first interconnect in this order via the amplifier circuit. Thus, since the time constant of each path of the second interconnect is reduced as described above, a signal delay in the repaired display interconnect can be reduced.

In the disconnection repairing step, a connection of the plurality of paths of the second interconnect other than the path connected to the one end of the display interconnect may be removed.

In the above method, the connection of the plurality of paths of the second interconnect other than the path connected to the one end of the display interconnect is removed in the disconnection repairing step. This eliminates the electrical resistance and the electrical capacitance in such a path that is not required after the disconnection is repaired. Thus, the load that is placed on the second interconnect after the disconnection is repaired can be reduced.

A part of the first interconnect located beyond the display interconnect having the disconnection detected in the disconnection detecting step may be cut in the disconnection repairing step.

In the above method, the part of the first interconnect located beyond the display interconnect having the disconnection detected in the disconnection detecting step is cut in the disconnection repairing step. This eliminates the electrical resistance and the electrical capacitance in the part of the first interconnect that is not required after the disconnection is repaired. Thus, the load that is placed on the first interconnect after the disconnection is repaired can be reduced.

An active matrix substrate according to the present invention includes: a plurality of display interconnects provided so as to extend parallel to each other; a drive circuit provided at one ends of the display interconnects, and connected to the display interconnects; a first interconnect provided so as to cross the other ends of the display interconnects in an insulating state; and a second interconnect provided so as to cross the one ends of the display interconnects in an insulating state, and so as to be connected to the first interconnect. The active matrix substrate is configured so that when any of the display interconnects is disconnected, a display signal from the drive circuit is supplied to the other side of the disconnected display interconnect sequentially through the second interconnect and the first interconnect in this order via an amplifier circuit. The second interconnect is configured so that the display signal from the drive circuit is supplied to the first interconnect via a plurality of paths that are different from each other.

With the above configuration, the second interconnect crossing the one ends of the display interconnects is configured so that the display signal from the drive circuit provided at the one ends of the display interconnects is supplied to the first interconnect crossing the other ends of the display interconnects, via the plurality of paths that are different from each other. Thus, if the plurality of display interconnects are equally divided into n groups (where n is a natural number of 2 or more) each formed by adjoining ones of the display interconnects, and the paths of the second interconnect are arranged so as to correspond to the n groups of the display interconnects, the electrical resistance of each path of the second interconnect is R/n, and the electrical capacitance at the intersection of each path of the second interconnect and the display interconnect is C/n, whereby the time constant of each path of the second interconnect is $\tau=RC/n^2$, as compared to the case where the second interconnect is provided simply in an L shape (see FIG. 21; the time constant of the second interconnect: $\tau=RC$). The display signal from the drive circuit is supplied to the other side of the disconnected display interconnect sequentially through the second interconnect and the first interconnect in this order via the amplifier circuit. Thus, since the time constant of each path of the second interconnect is reduced as described above, a signal delay in the repaired display interconnect can be reduced in the active matrix substrate.

An active matrix substrate according to the present invention includes: a plurality of display interconnects provided so as to extend parallel to each other; a drive circuit provided at one ends of the display interconnects, and connected to the display interconnects; a first interconnect provided so as to cross the other ends of the display interconnects in an insulating state, and having an amplifier circuit; and a second interconnect provided so as to cross the one ends of the display interconnects in an insulating state, and so as to be connected to the first interconnect. The active matrix substrate is configured so that when any of the display interconnects is disconnected, a display signal from the drive circuit is supplied to the other side of the disconnected display interconnect sequentially through the second interconnect and the first interconnect in this order. The second interconnect is configured so that the display signal from the drive circuit is supplied to the first interconnect via a plurality of paths that are different from each other.

With the above configuration, the second interconnect crossing the one ends of the display interconnects is configured so that the display signal from the drive circuit provided at the one ends of the display interconnects is supplied to the first interconnect crossing the other ends of the display interconnects, via the plurality of paths that are different from each other. Thus, if the plurality of display interconnects are equally divided into n groups (where n is a natural number of 2 or more) each formed by adjoining ones of the display interconnects, and the paths of the second interconnect are arranged so as to correspond to the n groups of the display interconnects, the electrical resistance of each path of the second interconnect is R/n, and the electrical capacitance at the intersection of each path of the second interconnect and the display interconnect is C/n, whereby the time constant of each path of the second interconnect is $\tau=RC/n^2$, as compared to the case where the second interconnect is provided simply in an L shape (see FIG. 21; the time constant of the second interconnect: $\tau=RC$). The display signal from the drive circuit is supplied to the other side of the disconnected display interconnect sequentially through the second interconnect and the first interconnect in this order via the amplifier circuit. Thus, since the time constant of each path of the second interconnect is reduced as described above, a signal delay in the repaired display interconnect can be reduced in the active matrix substrate.

Advantages of the Invention

According to the present invention, the second interconnect crossing the one ends of the display interconnects is configured so that the display signal from the drive circuit is supplied to the first interconnect crossing the other ends of the display interconnects, via the plurality of paths that are different from each other. Thus, a signal delay in the repaired display interconnect can be reduced.

BRIEF DESCRIPTION OF THE DRAWINGS

FIG. 2 is a plan view showing one pixel in an active matrix substrate 20a of the LCD 50a.

DESCRIPTION OF EMBODIMENTS

Embodiments of the present invention will be described in detail below with reference to the accompanying drawings. Note that the present invention is not limited to the following embodiments.

First Embodiment

FIGS. 1-4 show a first embodiment of a display device, a manufacturing method thereof, and an active matrix substrate according to the present invention.

Figure 1:
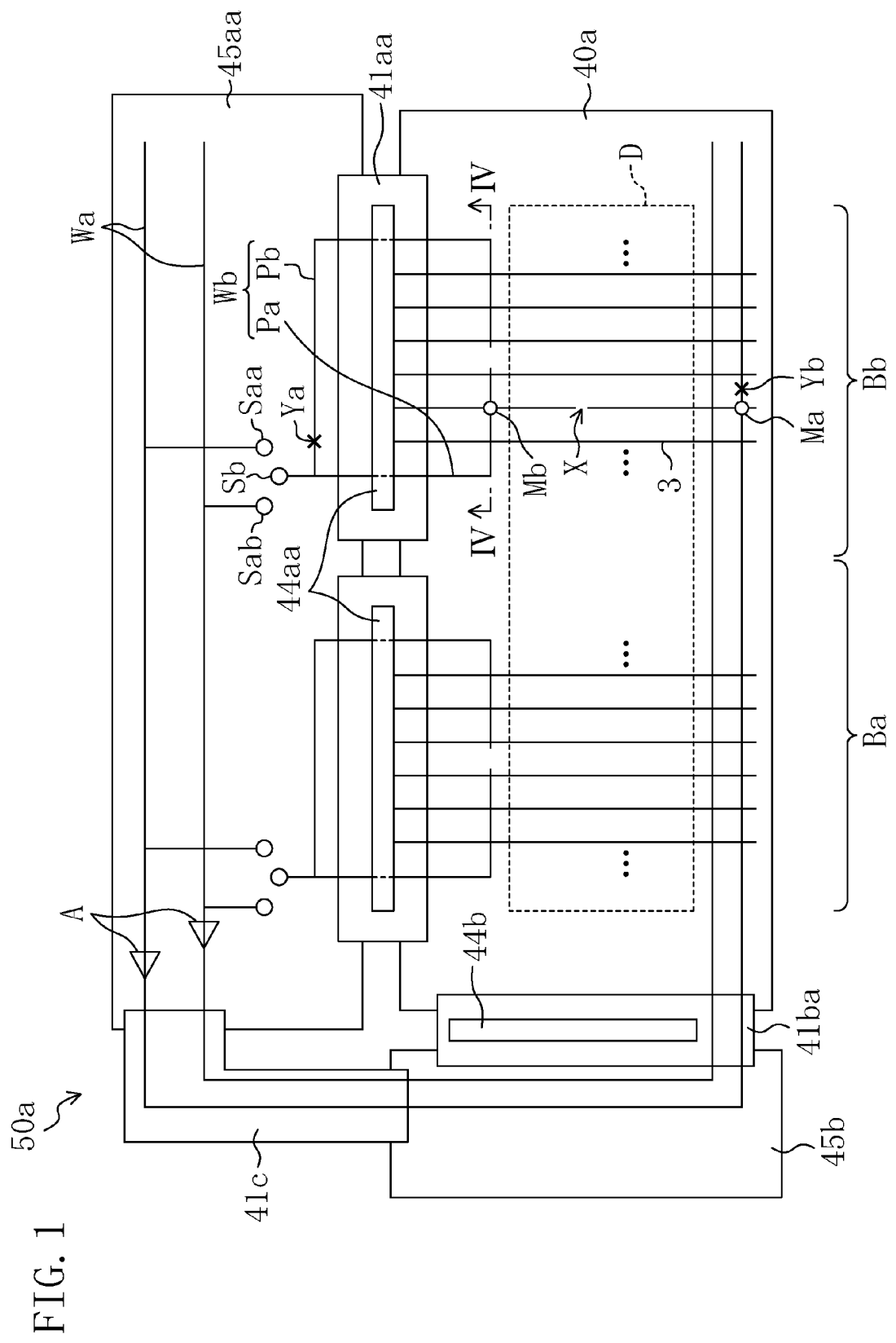
FIG. 1 is a plan view of an LCD 50a of a first embodiment.
Figure 2:
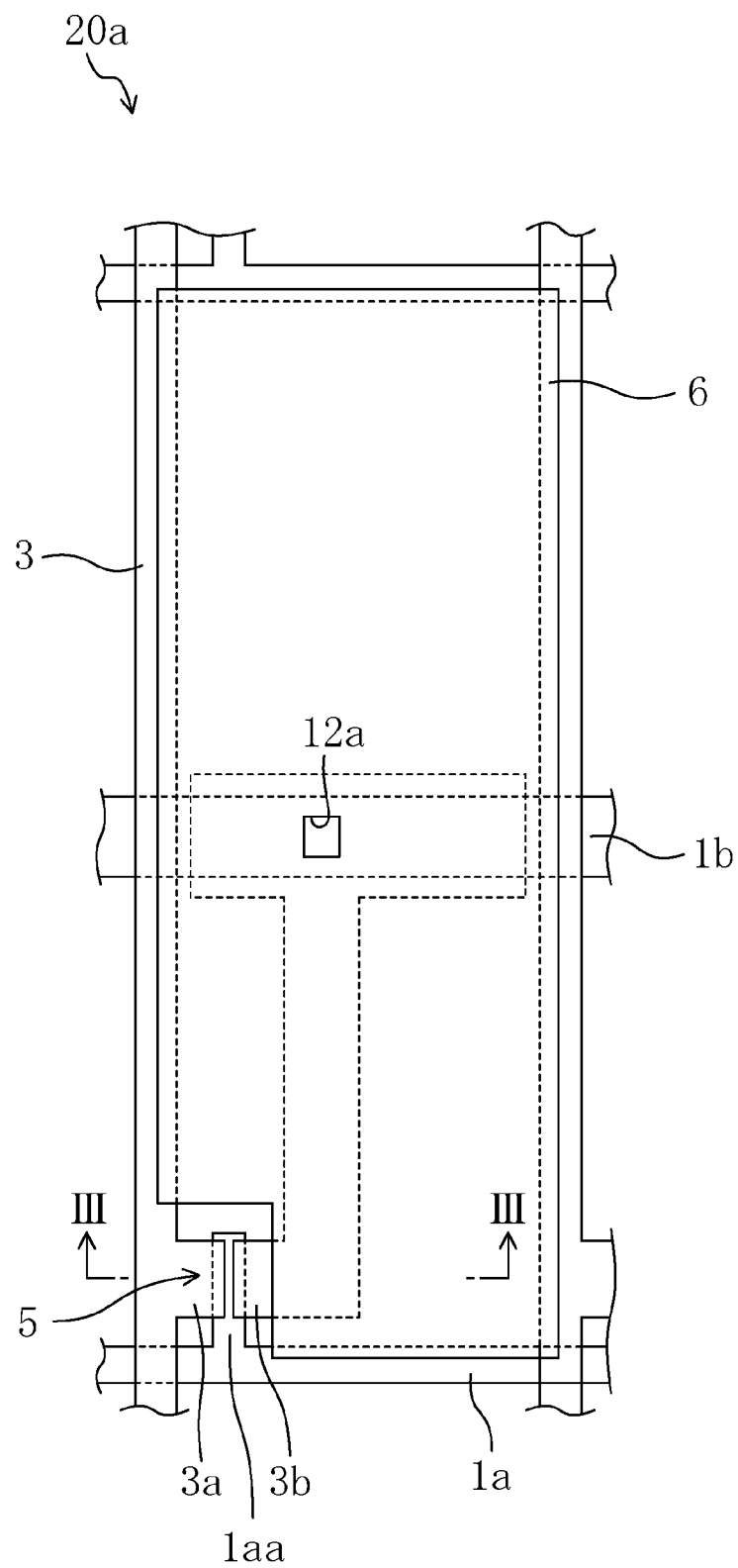
Figure 3:
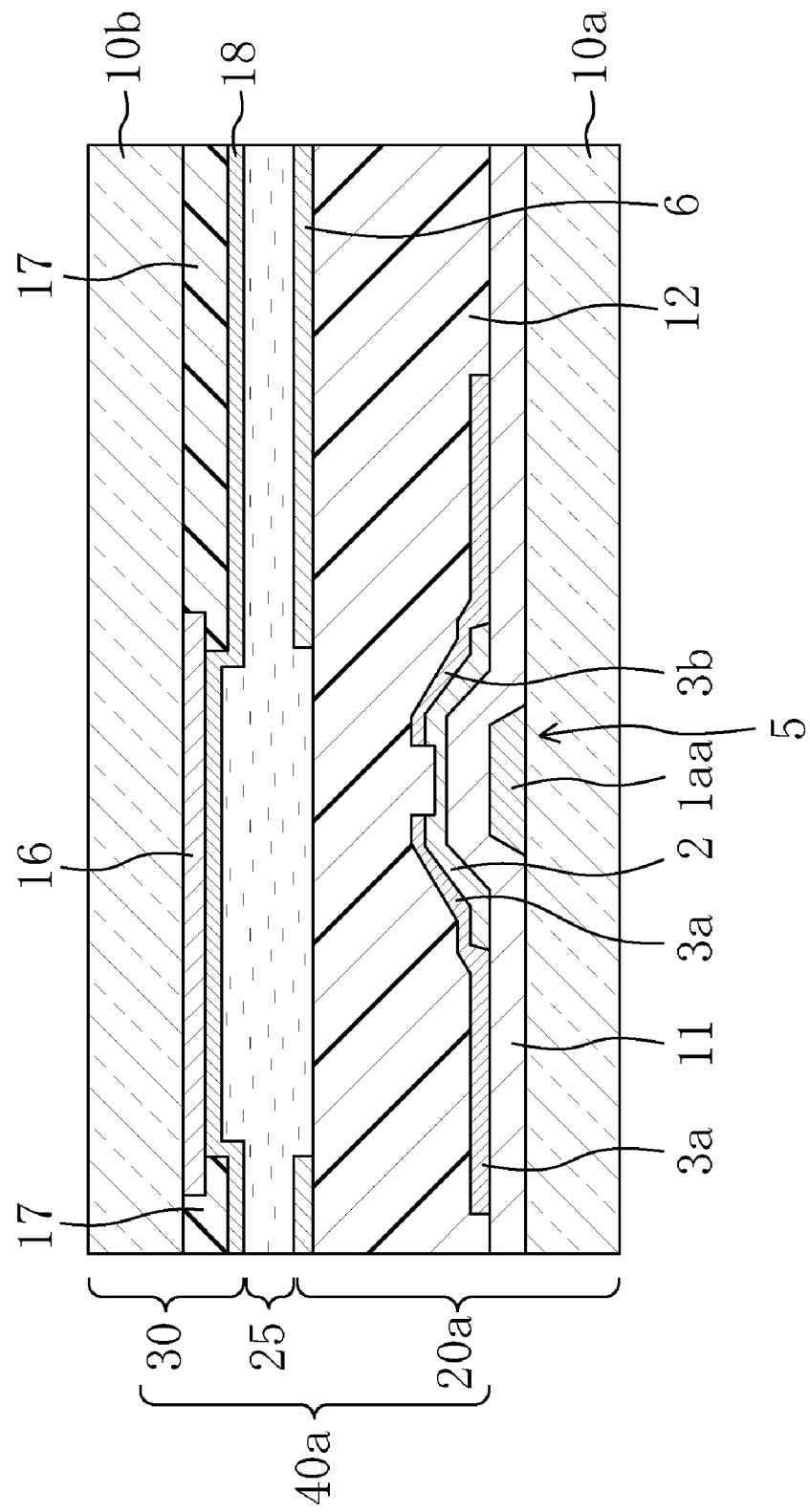
FIG. 3 is a cross-sectional view of the active matrix substrate 20a and an LCD panel 40a including the same, taken along line III-III in FIG. 2.
Figure 4:
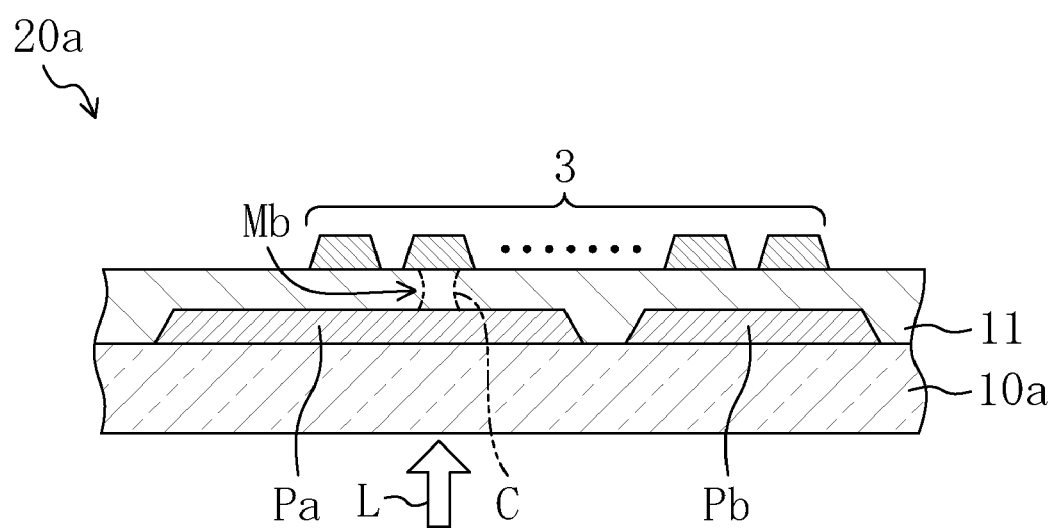
FIG. 4 is a cross-sectional view of the active matrix substrate 20a taken along line IV-IV in FIG. 1.

Specifically, FIG. 1 is a plan view of an LCD 50a of the present embodiment, and FIG. 2 is a plan view showing one pixel in an active matrix substrate 20a of the LCD 50a. FIG. 3 is a cross-sectional view of the active matrix substrate 20a and an LCD panel 40a including the same, taken along line III-III in FIG. 2, and FIG. 4 is a cross-sectional view of the active matrix substrate 20a taken along line IV-IV in FIG. 1.

As shown in FIG. 1, the LCD 50a includes: an LCD panel 40a; two source-side TCPs 41aa attached to the upper end of the LCD panel 40a in the figure via an anisotropic conductive film (ACF, not shown); a gate-side TCP 41ba attached to the left end of the LCD panel 40a in the figure via an ACF (not shown); a source-side PWB 45aa attached to the upper ends of the source-side TCPs 41aa in the figure via an ACF (not shown); a gate-side PWB 45b attached to the left end of the gate-side TCP 41ba in the figure via an ACF (not shown); and an FPC 41c attached to the left end of the source-side PWB 45aa and the upper end of the gate-side PWB 45b in the figure.

As shown in FIG. 3, the LCD panel 40a includes the active matrix substrate 20a and a counter substrate 30 that are positioned so as to face each other, and a liquid crystal layer 25 provided between the active matrix substrate 20a and the counter substrate 30.

As shown in FIG. 1, a display region D for displaying an image is defined in the LCD panel 40a, and the display region D has two blocks Ba, Bb that extend parallel to each other.

As shown in FIGS. 1-3, the active matrix substrate 20a includes in the display region D: a plurality of gate lines 1a provided as display interconnects on an insulating substrate 10a so as to extend parallel to each other; a plurality of capacitor lines 1b each provided between adjoining ones of the gate lines 1a so as to extend parallel to each other; a gate insulating film 11 provided so as to cover the gate lines 1a and the capacitor lines 1b; a plurality of source lines 3 provided as display interconnects on the gate insulating film 11 so as to extend parallel to each other in a direction perpendicular to the gate lines 1a; a plurality of thin film transistors (TFTs) 5 provided at the intersections of the gate lines 1a and the source lines 3; an interlayer insulating film 12 provided so as to cover the TFTs 5 and the source lines 3; a plurality of pixel electrodes 6 provided in a matrix pattern on the interlayer insulating film 12; and an alignment film (not shown) provided so as to cover the pixel electrodes 6.

As shown in FIGS. 2-3, each TFT 5 includes: a gate electrode 1aa that is a laterally protruding portion of the gate line 1a; the gate insulating film 11 provided so as to cover the gate electrode 1aa; an island-shaped semiconductor layer 2 provided at a position corresponding to the gate electrode 1aa on the gate insulating film 11; and a source electrode 3a and a drain electrode 3b provided so as to face each other on the semiconductor layer 2. As shown in FIG. 2, the source electrode 3a is a laterally protruding portion of the source line 3. As shown in FIG. 2, the drain electrode 3b is extended to a region that overlaps the capacitor line 1b, thereby forming an auxiliary capacitor. The drain electrode 3b is connected to the pixel electrode 6 via a contact hole 12a formed in the interlayer insulating film 12 over the capacitor line 1b.

As shown in FIG. 3, the counter substrate 30 includes: an insulating substrate 10b; a black matrix 16 provided in a frame shape on the insulating substrate 10b and in a grid pattern in the frame; a color filter 17 including red, green, and blue layers provided between the grid lines of the black matrix 16; a common electrode 18 provided so as to cover the black matrix 16 and the color filter 17; columnar photo spacers (not shown) provided on the common electrode 18; and an alignment film (not shown) provided so as to cover the common electrode 18.

The liquid crystal layer 25 is made of a nematic liquid crystal material having electro-optic characteristics, etc.

As shown in FIG. 1, each of the source-sides TCP 41aa is a film substrate having a source driver 44aa mounted thereon. The source lines 3 arranged in each block Ba, Bb are connected to a corresponding one of the source drivers 44aa.

As shown in FIG. 1, the gate-side TCP 41ba is a film substrate having a gate driver 44b mounted thereon. The gate lines la are connected to the gate driver 44b.

As shown in FIG. 1, the LCD 50a has two first interconnects Wa extending along the lower side of the LCD panel 40a in the figure so as to cross the lower ends of the source lines 3 in the figure, and extending along the upper side of the source-side PWB 45aa in the figure via the gate-side TCP 41ba, the gate-side PWB 45b, and the FPC 41c. As shown in FIG. 1, each of the first interconnects Wa has an amplifier circuit A in its left end on the source-side PWB 45aa in the figure. In the source-side PWB 45aa, as shown in FIG. 1, the outer first interconnect Wa in the figure is provided with connection terminals Saa for being soldered to connection terminals Sb of second interconnects Wb that will be described later, and the inner first interconnect Wa in the figure is similarly provided with connection terminals Sab for being soldered to the connection terminals Sb of the second interconnects Wb.

As shown in FIG. 1, the LCD 50a further has two second interconnects Wb in the blocks Ba, Bb. Each of the second interconnects Wb has a first path Pa provided substantially in an L shape so as to cross the upper ends of the source lines 3 in the left interconnect group in the figure, and a second path Pb provided substantially in a U shape so as to cross the upper ends of the source lines 3 in the right interconnect group in the figure.

In the LCD 50a having the above configuration, when the TFT 5 in each pixel as a minimum unit of an image is turned on in response to a gate signal sent from the gate driver 44b to the gate electrode 1aa via the gate line 1a, a source signal is sent from the source driver 44aa to the source electrode 3a via the source line 3, and a predetermined amount of charge is written to the pixel electrode 6 via the semiconductor layer 2 and the drain electrode 3b. This produces a potential difference between the pixel electrode 6 of the active matrix substrate 20a and the common electrode 18 of the counter substrate 30, whereby a predetermined voltage is applied to the liquid crystal layer 25. The LCD 50a displays an image by adjusting the light transmittance of the liquid crystal layer 25 by changing the alignment state of the liquid crystal layer 25 according to the magnitude of the applied voltage to the liquid crystal layer 25.

An example of a manufacturing method (and a repairing method) of the LCD 50a of the present embodiment will be described below. The manufacturing method of the present embodiment includes an active matrix substrate fabricating step, a counter substrate fabricating step, an LCD panel fabricating step, a disconnection detecting step, a disconnection repairing step, and a mounting step.

[Active Matrix Substrate Fabricating Step]

First, for example, a titanium film, an aluminum film, a titanium film, etc. are sequentially formed by a sputtering method on the entire surface of an insulating substrate 10a such as a glass substrate. The films are then patterned by photolithography to form gate lines 1a, gate electrodes 1aa, capacitor lines 1b, a panel portion of first interconnects Wa, and a panel portion of second interconnects Wb with a thickness of about 4,000 Å.

Next, for example, a silicon nitride film, etc. is formed by a plasma chemical vapor deposition (CVD) method over the entire substrate having the gate lines 1a, the gate electrodes 1aa, the capacitor lines 1b, the panel portion of the first interconnects Wa, and the panel portion of the second interconnects Wb to form a gate insulating film 11 with a thickness of about 4,000 Å.

Then, for example, an intrinsic amorphous silicon film and a phosphorus-doped n+ amorphous silicon film are sequentially formed by a plasma CVD method over the entire substrate having the gate insulating film 11 formed thereon. The intrinsic amorphous silicon film and the phosphorus-doped n+ amorphous silicon film are then patterned by photolithography into an island shape on the gate electrodes 1aa to form a semiconductor formation layer in which the intrinsic amorphous silicon layer having a thickness of about 2,000 Å and the n+ amorphous silicon layer having a thickness of about 500 Å are stacked.

Thereafter, for example, an aluminum film, a titanium film, etc. are formed by a sputtering method over the entire substrate having the semiconductor formation layer formed thereon. The films are then patterned by photolithography to form source lines 3, source electrodes 3a, and drain electrodes 3b with a thickness of about 2,000 Å.

Then, by using the source electrodes 3a and the drain electrodes 3b as a mask, the n+ amorphous silicon layer of the semiconductor formation layer is etched to pattern channel portions, thereby forming a semiconductor layer 2 and TFTs 5 having the same.

For example, an acrylic photosensitive resin is then applied by a spin coating method to the entire substrate having the TFTs 5 formed thereon. The applied photosensitive resin is exposed via a photomask and developed to form an interlayer insulating film 12 having contact holes 12a on the drain electrodes 3b, and having a thickness of about 2 μm.

Subsequently, for example, an indium tin oxide (ITO) film is formed by a sputtering method over the entire substrate having the interlayer insulating film 12 formed thereon. The ITO film is then patterned by photolithography to form pixel electrodes 6 with a thickness of about 1,000 Å.

Finally, a polyimide resin is applied by a printing method to the entire substrate having the pixel electrodes 6 formed thereon. The polyimide resin is then rubbed to form an alignment film with a thickness of about 1,000 Å.

The active matrix substrate 20a can be fabricated in this manner.

[Counter Substrate Fabricating Step]

First, for example, an acrylic photosensitive resin having fine particles such as carbon dispersed therein is applied by a spin coating method to the entire surface of an insulating substrate 10b such as a glass substrate. The applied photosensitive resin is exposed via a photomask and developed to form a black matrix 16 with a thickness of about 1.5 μm.

Next, for example, a red, green, or blue-colored acrylic photosensitive resin is applied to the substrate having the black matrix 16 formed thereon. The applied photosensitive resin is exposed via a photomask and developed to pattern a colored layer of a selected color (e.g., a red layer) with a thickness of about 2.0 μm. Similar steps are repeated for the remaining two colors to form colored layers of the two colors (e.g., a green layer and a blue layer) with a thickness of about 2.0 μm. A color filter 17 is formed in this manner.

For example, an ITO film is then formed by a sputtering method over the substrate having the color filter 17 formed thereon to form a common electrode 18 with a thickness of about 1,500 Å.

Thereafter, a phenol novolac photosensitive type resin is applied by a spin coating method to the entire substrate having the common electrode 18 formed thereon. The applied photosensitive resin is exposed via a photomask and developed to form photo spacers with a thickness of about 4 μm.

Finally, a polyimide resin is applied by a printing method to the entire substrate having the photo spacers formed thereon. The polyimide resin is then rubbed to form an alignment film with a thickness of about 1,000 Å.

The counter substrate 30 can be fabricated in this manner.

[LCD Panel Fabricating Step]

First, by using, e.g., a dispenser, a sealant, which is made of an ultraviolet (UV) curable, thermosetting resin, etc., is applied (written or painted) in a frame shape to the counter substrate 30 fabricated by the counter substrate fabricating step.

Next, a liquid crystal material is dropped onto a region inside the sealant on the counter substrate 30 having the sealant applied thereto.

Then, the counter substrate 30 having the liquid crystal material dropped thereon is bonded under reduced pressure to the active matrix substrate 20*a* fabricated in the active matrix substrate fabricating step. The bonded body of the counter substrate 30 and the active matrix substrate 20*a* is exposed to atmospheric pressure to press the front and rear surfaces of the bonded body.

Finally, the sealant held in the bonded body is irradiated with UV light, and the bonded body is heated to cure the sealant.

The LCD panel 40*a* can be fabricated in this manner. Thereafter, polarizers are bonded to the front and rear surfaces of the LCD panel 40*a*. Note that the polarizers may be bonded before a disconnection detecting step, or in a mounting step that will be described later. In the case where the polarizers are bonded in the mounting step, the polarizers are bonded to the front and rear surfaces of the LCD panel 40*a* in which no disconnection has been detected in the disconnection detecting step or the LCD panel 40*a* in which each disconnection has been repaired in the disconnection repairing step.

Then, the LCD panel 40*a* thus fabricated is subjected to the disconnection detecting step described below, and if the presence of any disconnection is detected in the source lines 3, the disconnection is repaired by the disconnection repairing step described below.

[Disconnection Detecting Step]

For example, a gate inspection signal, which is a signal of a bias voltage of −10 V and a pulse voltage of +15 V having a period of 16.7 msec and a pulse width of 50 μsec, is applied to the gate lines 1*a* to turn on all the TFTs 5. Moreover, a source inspection signal, which is a signal having a potential of ±2 V with its polarity inverted every 16.7 msec, is applied to the source lines 3 to write the amount of charge corresponding to ±2 V to the pixel electrodes 6 via the source electrodes 3*a* and the drain electrodes 3*b* of the TFTs 5. At the same time, a common electrode inspection signal having a direct current (DC) potential of −1 V is applied to the common electrode 18.

At this time, a voltage is applied to a liquid crystal capacitor formed between the pixel electrodes 6 and the common electrode 18, whereby the pixels formed by the pixel electrodes 6 are operated, and the display screen switches from white display to black display in a normally white mode (white display is provided when no voltage is applied). At this time, this display state can be visually verified by placing a light source on the back side of the LCD panel 40*a*.

Note that in the case where no polarizer is bonded to the LCD panel 40*a* in the LCD panel fabricating step, the polarizers are placed on the front side of the LCD panel 40*a* and between the LCD panel 40*a* and the light source to verify the display state.

In the pixels located along a disconnected source line, a predetermined amount of charge cannot be written to the pixel electrodes 6, and the pixels are not operated (bright spots). Thus, a disconnected position (a position X) of the source line 3 is detected.

[Disconnection Repairing Step]

First, as shown in FIG. 4, the intersection Ma (see FIG. 1) of the source line 3 having a disconnection detected in the position X in the disconnection detecting step and the first interconnect Wa, and the intersection Mb (see FIG. 1) of this source line 3 and the second interconnect Wb are irradiated with laser light L oscillated from a yttrium aluminum garnet (YAG) laser from the insulating substrate 10*a* side. Thus, contact holes C are formed in the gate insulating film 11 at the intersections Ma, Mb, and metal layers that form the interconnects are melted to make an electrical connection between the lower part of the disconnected source line 3 in FIG. 1 and the first interconnect Wa, and an electrical connection between the upper part of the disconnected source line 3 in FIG. 1 and the second interconnect Wb.

Next, a connection terminal Saa of the outer first interconnect Wa in FIG. 1 connected to the lower part of the disconnected source line 3 in FIG. 1 is connected to a connection terminal Sb of the right second interconnect Wb in FIG. 1 by soldering, thereby making an electrical connection between the outer first interconnect Wa and the right second interconnect Wb in the figure.

As shown in FIG. 1, in the right second interconnect Wb in FIG. 1, the second path Pb may be cut at a position Ya by laser radiation. This eliminates the electrical resistance and the electrical capacitance in the second path Pb that is not required after the disconnection is repaired. Thus, the load that is placed on the second interconnect Wb after the disconnection is repaired can be reduced.

Moreover, as shown in FIG. 1, the outer first interconnect Wa in FIG. 1 may be cut at a position Yb by laser radiation. This eliminates the electrical resistance and the electrical capacitance in the part of the first interconnect Wa located beyond the position Yb, which is not required after the disconnection is repaired. Thus, the load that is placed on the first interconnect Wa after the disconnection is repaired can be reduced.

[Mounting Step]

Two source-side TCPs 41*aa*, a gate-side TCP 41*ba*, and an FPC 41*c* are bonded in advance to a gate-side PWB 45*b* and a source-side PWB 45*aa* via an ACF, and the source-side TCPs 41*aa* and the gate-side TCP 41*ba* are bonded via an ACF to the LCD panel 40*a* having no disconnection detected in the disconnection detecting step, or the LCD panel 40*a* having each disconnection repaired in the disconnection repairing step.

The LCD 50*a* of the present embodiment can be manufactured in this manner.

Figure 21:
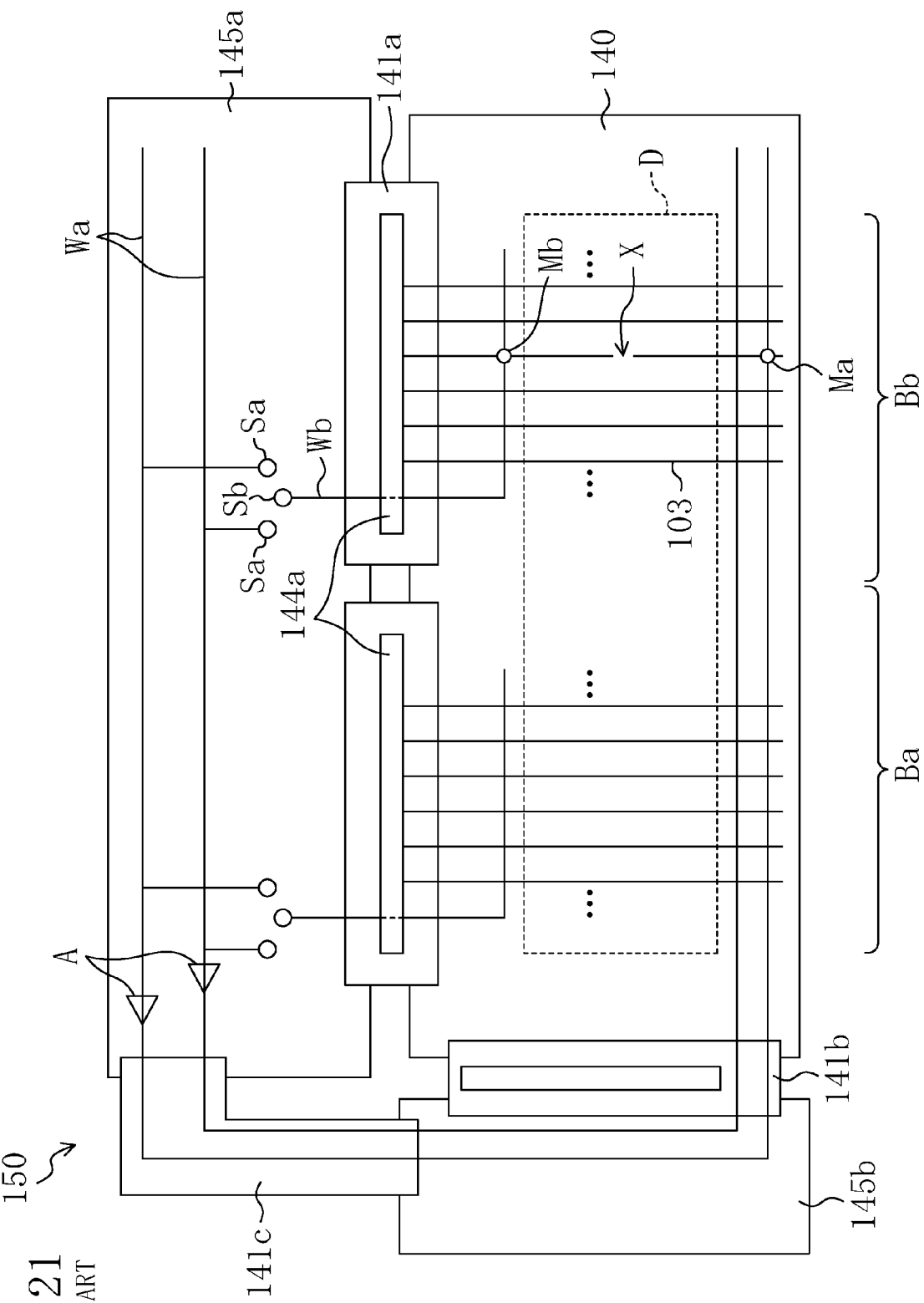
FIG. 21 is a plan view of a conventional LCD 150.

As described above, according to the LCD 50*a* of the present embodiment and the manufacturing method thereof, in each block Ba, Bb, the second interconnect Wb crossing one ends of the source lines 3 is configured so that a source signal from the source driver 44*aa* provided at the one ends of the source lines 3 is supplied to the first interconnect Wa crossing the other ends of the source lines 3, via the plurality of paths Pa, Pb that are different from each other. In each block Ba, Bb, the plurality of source lines 3 are substantially equally divided into two groups each formed by adjoining ones of the source lines 3, and the paths Pa, Pb of the second interconnect Wb are arranged in the two groups of the plurality of source lines 3. Thus, as compared to the case where the second interconnect Wb is provided simply in an L shape (see FIG. 21; the time constant of the second interconnect: τ=RC), the electrical resistance of each path Pa, Pb of the second interconnect Wb is R/2, and the electrical capacitance at the intersection of each path Pa, Pb of the second interconnect Wb and the source line 3 is C/2, whereby the time constant of each path Pa, Pb of the second interconnect Wb is τ=RC/4. In the disconnection repairing step, the intersections of the source line 3 having a disconnection detected in the disconnection detecting step and the first and second interconnects Wa, Wb are irradiated with laser light L. Thus, a source signal from the source driver 44aa is supplied to the other side of the source line 3 having the detected disconnection, sequentially through the second interconnect Wb and the first interconnect Wa in this order via the amplifier circuit A. Thus, since the time constant of each path Pa, Pb of the second interconnect Wb is reduced as described above, and a signal delay in the repaired source line 3 can be reduced.

According to the LCD 50a of the present embodiment, since the source driver 44aa is provided in each block Ba, Bb, disconnections of the source lines 3 of the blocks Ba, Bb can be repaired on a block-by-block basis.

Second Embodiment

Figure 5:
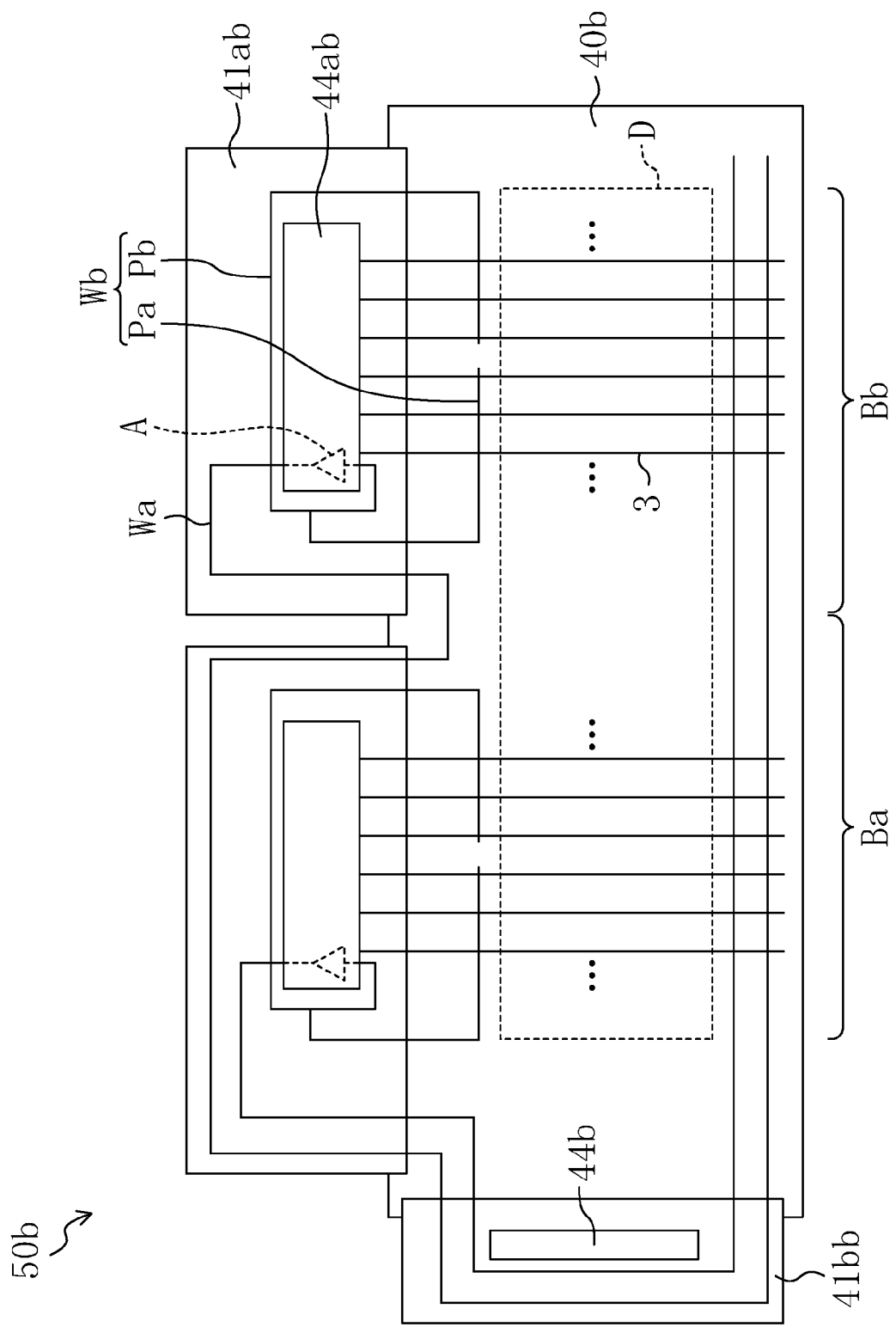
FIG. 5 is a plan view of an LCD 50b of a second embodiment.

FIG. 5 is a plan view of an LCD 50b of the present embodiment. Note that in the following embodiments, the same parts as those of FIGS. 1-4 are denoted by the same reference characters, and detailed description thereof will be omitted.

As shown in FIG. 5, the LCD 50b includes: an LCD panel 40b; two source-side systems on film (SOFs) 41ab attached to the upper end of the LCD panel 40b in the figure via an ACF (not shown); and a gate-side SOF 41bb attached to the left end of the LCD panel 40b in the figure via an ACF (not shown).

As shown in FIG. 5, the LCD panel 40b is substantially the same as the LCD panel 40a of the first embodiment except for the interconnect layout of the first and second interconnects Wa, Wb.

As shown in FIG. 5, each of the source-side SOFs 41ab is a film substrate having mounted thereon a source driver 44ab containing an amplifier circuit A. Source lines 3 arranged in each block Ba, Bb are connected to a corresponding one of the source drivers 44ab.

As shown in FIG. 5, the gate-side SOF 41bb is a film substrate having a gate driver 44b mounted thereon.

As shown in FIG. 5, the LCD 50b has two first interconnects Wa extending along the lower side of the LCD panel 40b in the figure so as to cross the lower ends of the source lines 3 in the figure, and each extending to the left end of the source driver 44ab of a corresponding one of the source-side SOFs 41ab via the gate-side SOF 41bb. As shown in FIG. 5, each of the first interconnects Wa is configured to extend through the amplifier circuit A in the source driver 44ab.

As shown in FIG. 5, the LCD 50b further has two second interconnects Wb in the blocks Ba, Bb. Each of the second interconnects Wb has a first path Pa provided substantially in an L shape so as to cross the upper ends of the source lines 3 in the left interconnect group in the figure, and a second path Pb provided substantially in a U shape so as to cross the upper ends of the source lines 3 in the right interconnect group in the figure.

The LCD 50b having the above configuration can be manufactured by changing the interconnect layout in the LCD 50a of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnects Wa, Wb.

According to the LCD 50b of the present embodiment and the manufacturing method thereof, as in the first embodiment, each of the second interconnects Wb crossing one ends of the source lines 3 is configured so that a source signal from the source driver 44ab is supplied to the first interconnect Wa crossing the other ends of the source lines 3, via the first and second paths Pa, Pb that are different from each other. Thus, a signal delay in the repaired source line 3 can be reduced.

According to the LCD 50b of the present embodiment, since the amplifier circuit A is contained in each source driver 44ab, the number of external substrates that are attached to the LCD panel 40b can be reduced.

Third Embodiment

Figure 6:
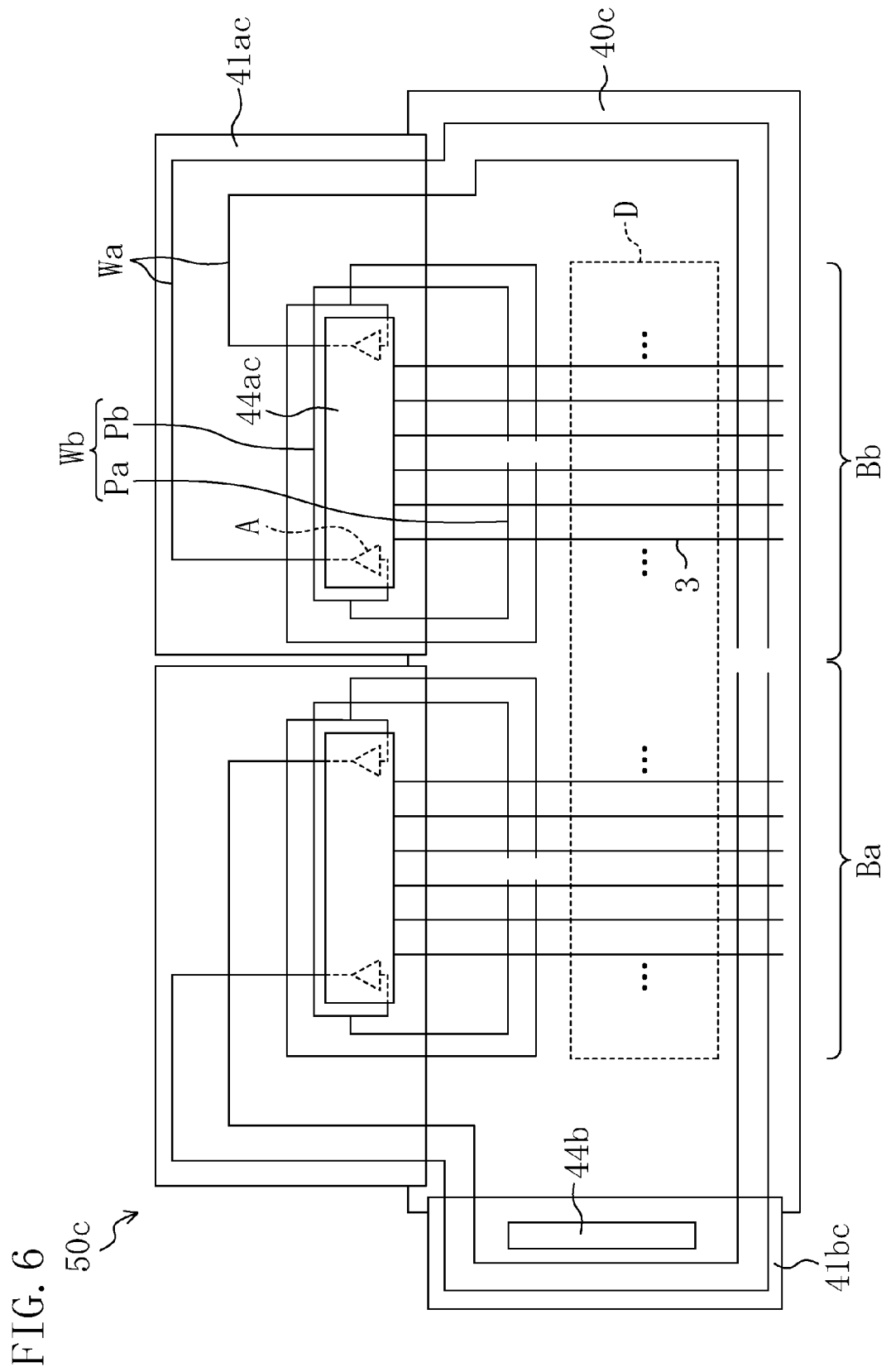
FIG. 6 is a plan view of an LCD 50c of a third embodiment.

FIG. 6 is a plan view of an LCD 50c of the present embodiment.

Although one amplifier circuit A is contained in each source driver 44ab in the second embodiment, two amplifier circuits A are contained in each source driver 44ac in the present embodiment.

As shown in FIG. 6, the LCD 50c includes: an LCD panel 40c; two source-side SOFs 41ac attached to the upper end of the LCD panel 40c in the figure via an ACF (not shown); and a gate-side SOF 41bc attached to the left end of the LCD panel 40c in the figure via an ACF (not shown).

As shown in FIG. 6, the LCD panel 40c is substantially the same as the LCD panel 40a of the first embodiment except for the interconnect layout of the first and second interconnects Wa, Wb.

As shown in FIG. 6, each of the source-side SOFs 41ac is a film substrate having mounted thereon the source driver 44ac containing two amplifier circuits A. Source lines 3 arranged in each block Ba, Bb are connected to a corresponding one of the source drivers 44ac.

As shown in FIG. 6, the gate-side SOF 41bc is a film substrate having a gate driver 44b mounted thereon.

As shown in FIG. 6, the LCD 50c has two first interconnects Wa in the block Ba, and two first interconnects Wa in the block Bb. The first interconnects Wa in the block Ba extend along the lower side of the LCD panel 40c in the figure so as to cross the lower ends of the source lines 3 in the figure, and extend to both ends of the source driver 44ac of the left source-side SOF 41ac in the figure via the gate-side SOF 41bc. The first interconnects Wa in the block Bb extend along the lower and right sides of the LCD panel 40c in the figure so as to cross the lower ends of the source lines 3 in the figure, and extend to both ends of the source driver 44ac of the right source-side SOF 41ac in the figure. As shown in FIG. 6, each of the first interconnects Wa is configured to extend through the amplifier circuit A in the source driver 44ac.

As shown in FIG. 6, the LCD 50c further has four second interconnects Wb in the blocks Ba, Bb. Each of the second interconnects Wb has a first path Pa provided substantially in an L shape (or substantially in a U shape) so as to cross the upper ends of the source lines 3 in the left interconnect group in the figure, and a second path Pb provided substantially in a U shape (or substantially in an L shape) so as to cross the upper ends of the source lines 3 in the right interconnect group in the figure. As shown in FIG. 6, in each block Ba, Bb, the inner second interconnect Wb in the figure is connected to the outer first interconnect Wa in the figure, and the outer second interconnect Wb in the figure is connected to the inner first interconnect Wa in the figure.

The LCD 50c having the above configuration can be manufactured by changing the interconnect layout in the LCD 50a of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnects Wa, Wb.

According to the LCD 50c of the present embodiment and the manufacturing method thereof, as in the first embodiment, each of the second interconnects Wb crossing one ends of the source lines 3 is configured so that a source signal from the source driver 44ac is supplied to the first interconnect Wa crossing the other ends of the source lines 3, via the first and second paths Pa, Pb that are different from each other. Thus, a signal delay in the repaired source line 3 can be reduced.

Fourth Embodiment

Figure 7:
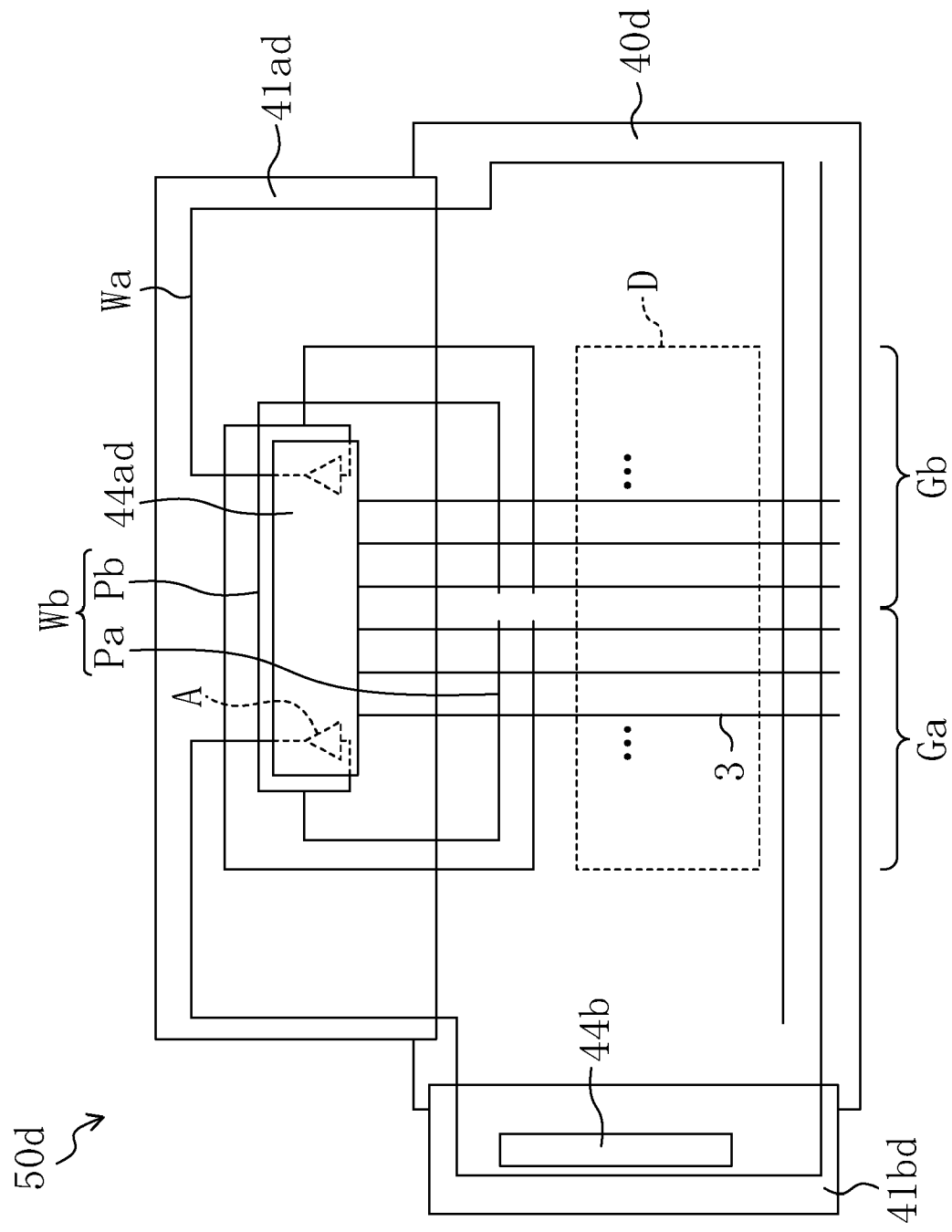
FIG. 7 is a plan view of an LCD 50d of a fourth embodiment before a disconnection is repaired.
Figure 8:
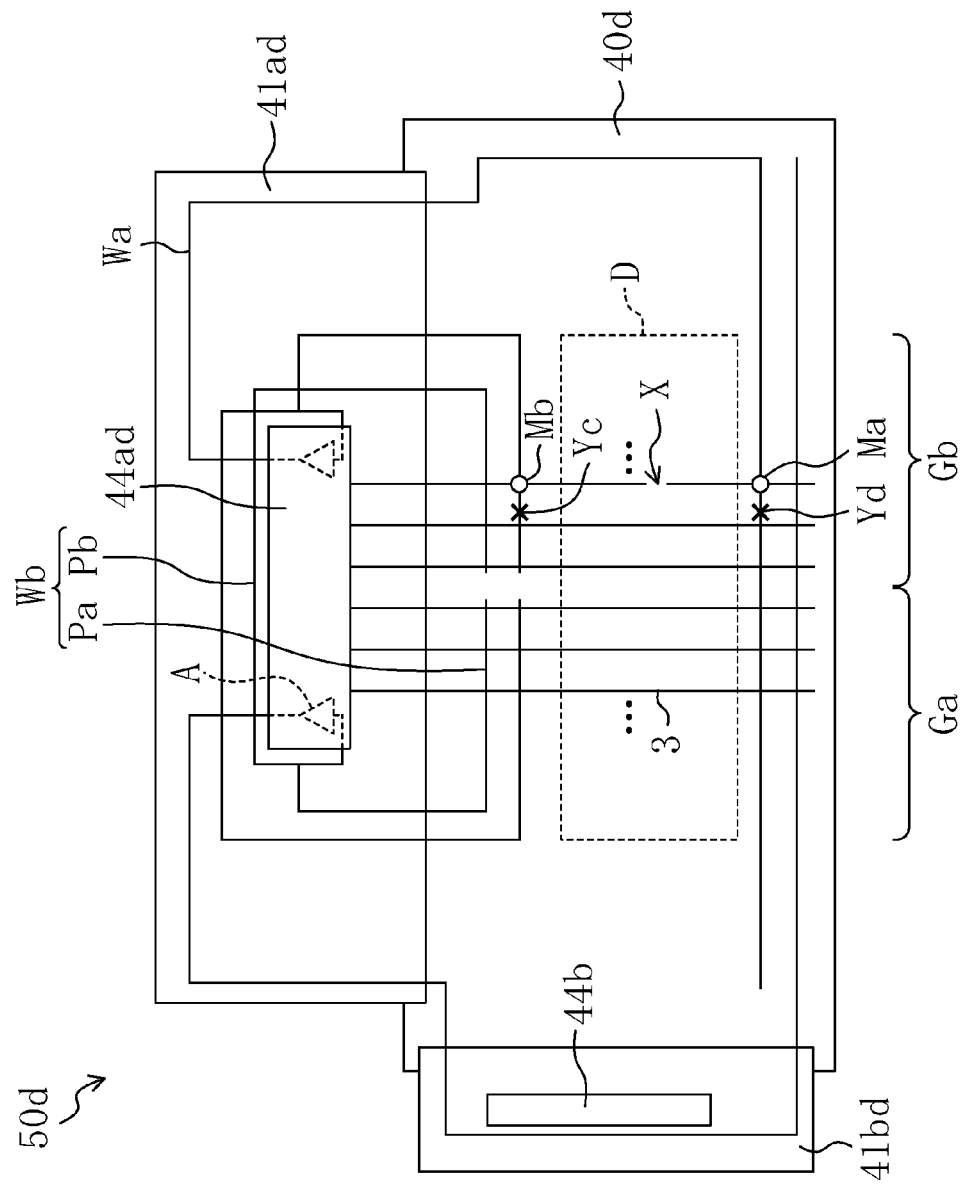
FIG. 8 is a plan view of the LCD 50d of the fourth embodiment after a disconnection has been repaired.

FIG. 7 is a plan view of an LCD 50d of the present embodiment before a disconnection is repaired, and FIG. 8 is a plan view of the LCD 50d of the present embodiment after a disconnection has been repaired.

Although two source drivers are provided for the LCD panel in the above embodiments, one source driver 44ad is provided for the LCD panel 40d in the present embodiment.

As shown in FIG. 7, the LCD 50d includes: an LCD panel 40d; a source-side SOF 41ad attached to the upper end of the LCD panel 40d in the figure via an ACF (not shown); and a gate-side SOF 41bd attached to the left end of the LCD panel 40d in the figure via an ACF (not shown).

As shown in FIG. 7, the LCD panel 40d is substantially the same as the LCD panel 40a of the first embodiment except for the interconnect layout of the first and second interconnects Wa, Wb.

As shown in FIG. 7, the source-side SOF 41ad is a film substrate having mounted thereon the source driver 44ad containing two amplifier circuits A. Source lines 3 in the left interconnect group Ga and the right interconnect group Gb in the figure are connected to the source driver 44ad.

As shown in FIG. 7, the gate-side SOF 41bd is a film substrate having a gate driver 44b mounted thereon.

As shown in FIG. 7, the LCD 50d has two first interconnects Wa. One of the first interconnects Wa extends along the lower side of the LCD panel 40d in the figure so as to cross the lower ends of the source lines 3 in the figure, and extends to the left end of the source driver 44ad of the source-side SOF 41ad in the figure via the gate-side SOF 41bd. The other first interconnect Wa extends along the lower and right sides of the LCD panel 40d so as to cross the lower ends of the source lines 3 in the figure, and extends to the right end of the source driver 44ad of the source-side SOF 41ad in the figure. As shown in FIG. 7, each of the first interconnects Wa is configured so as to extend through the amplifier circuit A in the source driver 44ad.

As shown in FIG. 7, the LCD 50d further has two second interconnects Wb. Each of the second interconnects Wb has a first path Pa provided substantially in an L shape (or substantially in a U shape) so as to cross the upper ends of the source lines 3 in the left interconnect group Ga in the figure, and a second path Pb provided substantially in a U shape (or substantially in an L shape) so as to cross the upper ends of the source lines 3 in the right interconnect group Gb in the figure. As shown in FIG. 7, the inner second interconnect Wb in the figure is connected to the first interconnect Wa extended on the left side of the figure, and the outer second interconnect Wb in the figure is connected to the first interconnect Wa extended on the right side of the figure.

The LCD 50d having the above configuration can be manufactured by changing the interconnect layout in the LCD 50a of the first embodiment, and the first interconnects Wa are connected in advance to the second interconnects Wb. Thus, as shown in FIG. 8, disconnections of the source lines 3 can be repaired by merely irradiating with laser light the intersection Ma of the source line 3 having a detected disconnection and the first interconnect Wa, and the intersection Mb of that source line 3 and the second interconnect Wb.

As shown in FIG. 8, in the outer second interconnect Wb in the figure, the second path Pa may be cut at a position Yc by laser radiation. This eliminates the electrical resistance and the electrical capacitance in the part of the second path Pb located beyond the position Yc, which is not required after the disconnection is repaired. Thus, the load that is placed on the second interconnect Wb after the disconnection is repaired can be reduced Moreover, as shown in FIG. 8, the inner first interconnect Wa in the figure may be cut at a position Yd by laser radiation. This eliminates the electrical resistance and the electrical capacitance in the part of the first interconnect Wa located beyond the position Yd, which is not required after the disconnection is repaired. Thus, the load that is placed on the first interconnect Wa after the disconnection is repaired can be reduced.

According to the LCD 50d of the present embodiment and the manufacturing method thereof, there is one source driver 44ad, and thus a signal delay tends to occur according to the position of the disconnected source line 3. However, as in the first embodiment, each of the second interconnects Wb crossing one ends of the source lines 3 is configured so that a source signal from the source driver 44ad is supplied to the first interconnect Wa crossing the other ends of the source lines 3 via the first and second paths Pa, Pb that are different from each other. Thus, the signal delay in the repaired source line 3 can be reduced.

Fifth Embodiment

Figure 9:
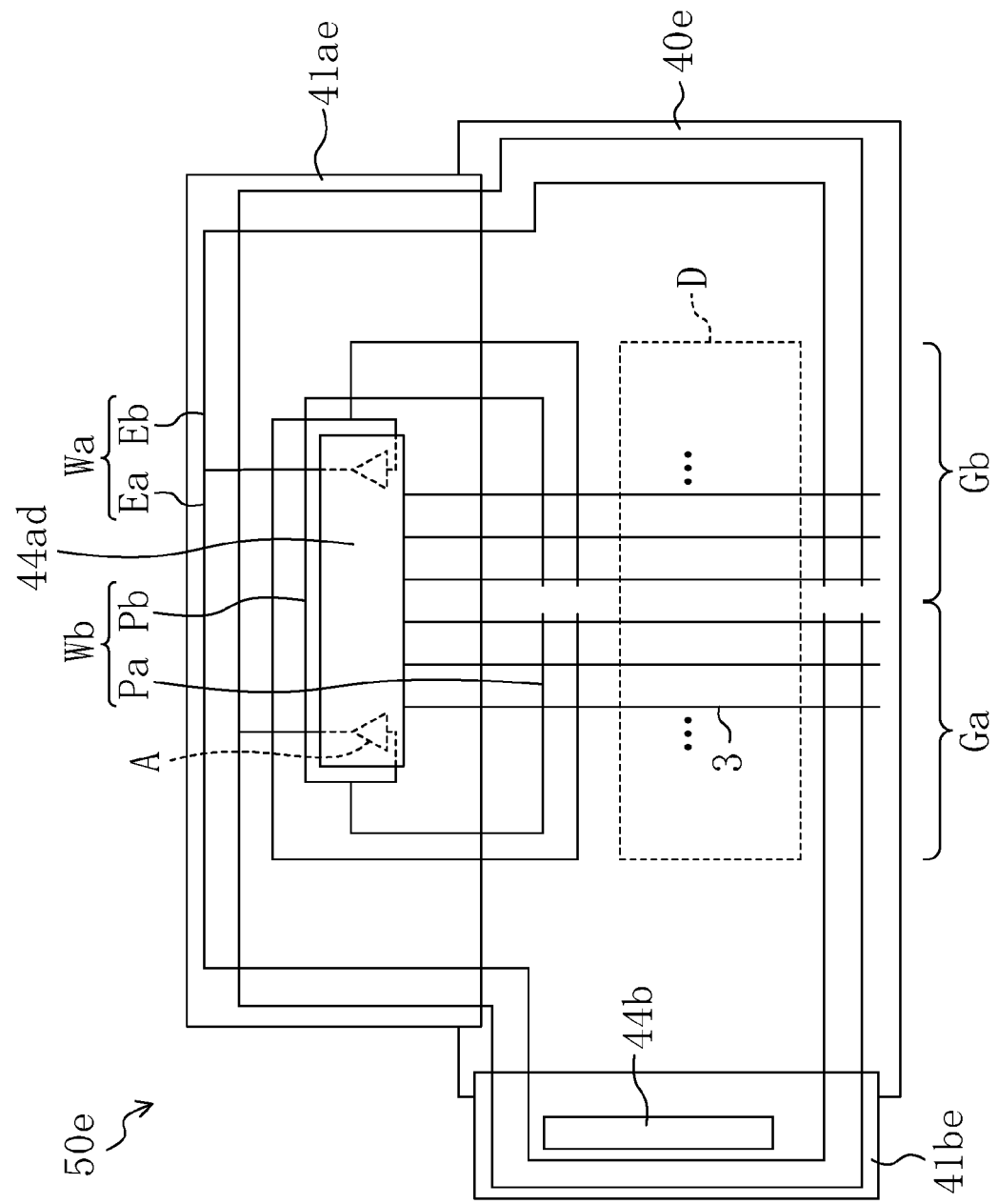
FIG. 9 is a plan view of an LCD 50e of a fifth embodiment before a disconnection is repaired.
Figure 10:
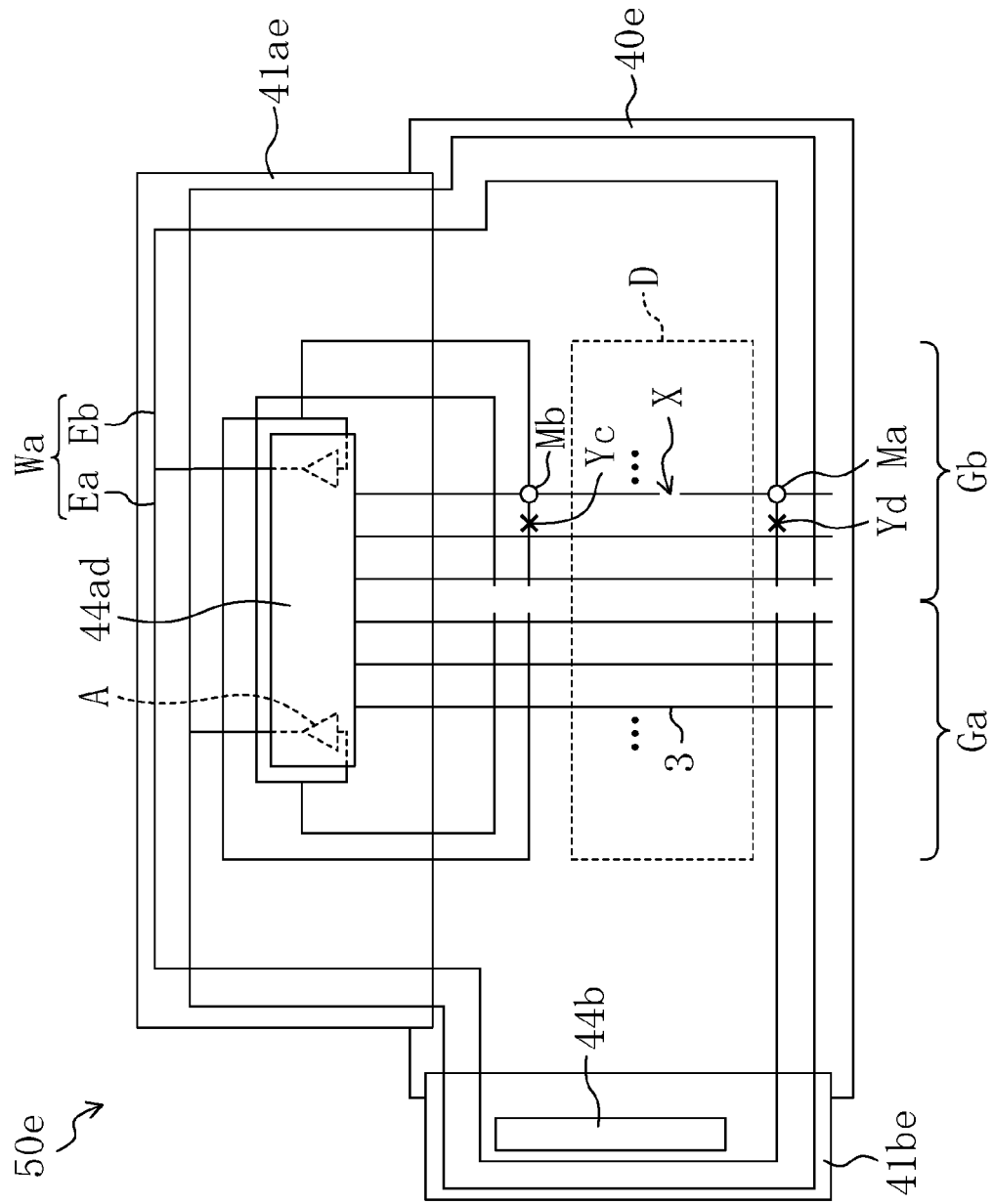
FIG. 10 is a plan view of the LCD 50e of the fifth embodiment after a disconnection has been repaired.

FIG. 9 is a plan view of an LCD 50e of the present embodiment before a disconnection is repaired, and FIG. 10 is a plan view of the LCD 50e of the present embodiment after a disconnection has been repaired.

Although each of the first interconnects Wa is provided so as to be extended in one direction in the fourth embodiment, each of the first interconnects Wa is provided so as to be extended in two different directions in the present embodiment.

As shown in FIG. 9, the LCD 50e includes: an LCD panel 40e; a source-side SOF 41ae attached to the upper end of the LCD panel 40e in the figure via an ACF (not shown); and a gate-side SOF 41be attached to the left end of the LCD panel 40e in the figure via an ACF (not shown).

As shown in FIG. 9, the LCD panel 40e is substantially the same as the LCD panel 40a of the first embodiment except for the interconnect layout of the first and second interconnects Wa, Wb.

As shown in FIG. 9, the source-side SOF 41ae is a film substrate having mounted thereon a source driver 44ad containing two amplifier circuits A.

As shown in FIG. 9, the gate-side SOF 41be is a film substrate having a gate driver 44b mounted thereon.

As shown in FIG. 9, the LCD 50e has two first interconnects Wa each having a first extended interconnect portion Ea and a second extended interconnect portion Eb. The first extended interconnect portion Ea extends along the lower side of the LCD panel 40e in the figure so as to cross the lower ends of source lines 3 in the left interconnect group Ga in the figure, and extends along the left and upper sides of the source-side SOF 41ae in the figure via the gate-side SOF 41be. The second extended interconnect portion Eb extends along the lower and right sides of the LCD panel 40e in the figure so as to cross the lower ends of source lines 3 in the right interconnect group Gb in the figure, and extends along the right and upper sides of the source-side SOF 41ae.

As shown in FIG. 9, the LCD 50e further has two second interconnects Wb. Each of the second interconnects Wb has a first path Pa provided substantially in an L shape (or substantially in a U shape) so as to cross the upper ends of the source lines 3 in the left interconnect group Ga in the figure, and a second path Pb provided substantially in a U shape (or substantially in an L shape) so as to cross the upper ends of the source lines 3 in the right interconnect group Gb in the figure. As shown in FIG. 9, the inner second interconnect Wb in the figure is connected to the outer first interconnect Wa in the figure in the LCD panel 40e, and the outer second interconnect Wb in the figure is connected to the inner first interconnect Wa in the figure in the LCD panel 40e.

The LCD 50e having the above configuration can be manufactured by changing the interconnect layout in the LCD 50a of the first embodiment, and the first interconnects Wa are connected in advance to the second interconnects Wb. Thus, as shown in FIG. 10, disconnections of the source lines 3 can be repaired by merely irradiating with laser light L the intersection Ma of the source line 3 having a detected disconnection and the first interconnect Wa, and the intersection Mb of that source line 3 and the second interconnect Wb.

As shown in FIG. 10, in the outer second interconnect Wb in the figure, the second path Pb may be cut at a position Yc by laser radiation. This eliminates the electrical resistance and the electrical capacitance in the part of the second path Pb located beyond the position Yc, which is not required after the disconnection is repaired. Thus, the load that is placed on the second interconnect Wb after the disconnection is repaired can be reduced.

Moreover, as shown in FIG. 10, the inner first interconnect Wa of the LCD panel 40e in the figure may be cut at a position Yd by laser radiation. This eliminates the electrical resistance and the electrical capacitance in the part of the first interconnect Wa located beyond the position Yd, which is not required after the disconnection is repaired. Thus, the load that is placed on the first interconnect Wa after the disconnection is repaired can be reduced.

According to the LCD 50e of the present embodiment and the manufacturing method thereof, as in the fourth embodiment, there is one source driver 44ad, and thus a signal delay tends to occur according to the position of the disconnected source line 3. However, as in the first embodiment, each of the second interconnects Wb crossing one ends of the source lines 3 is configured so that a source signal from the source driver 44ad is supplied to the first interconnect Wa crossing the other ends of the source lines 3 via the first and second paths Pa, Pb that are different from each other. Thus, the signal delay in the repaired source line 3 can be reduced.

According to the LCD 50e of the present embodiment, each of the first interconnects Wa is formed by the first extended interconnect portion Ea and the second extended interconnect portion Eb that are extended in different directions from each other. This reduces the electrical resistance and the electrical capacitance in each of the first interconnects Wa, whereby the signal delay in the repaired source line 3 can be reduced.

Sixth Embodiment

Figure 11:
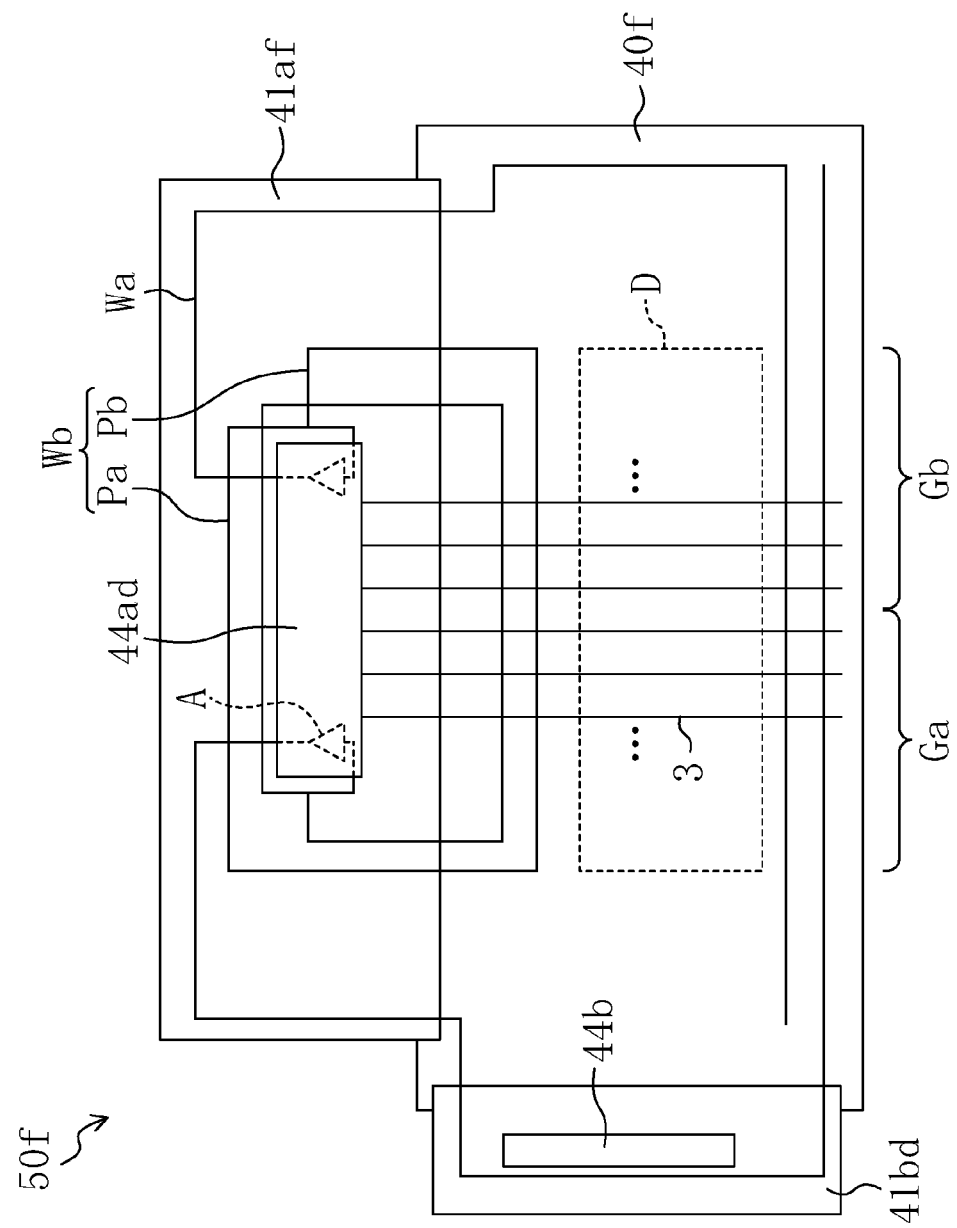
FIG. 11 is a plan view of an LCD 50f of a sixth embodiment.

FIG. 11 is a plan view of an LCD 50f of the present embodiment.

Although the first path Pa and the second path Pb of each of the second interconnects Wb are separated from each other at their tip ends so as to be independent of each other in the fourth embodiment, the first and second paths Pa, Pb are connected together in the present embodiment.

As shown in FIG. 11, the LCD 50f includes: an LCD panel 40f; a source-side SOF 41af attached to the upper end of the LCD panel 40f in the figure via an ACF (not shown); and a gate-side SOF 41bd attached to the left end of the LCD panel 40f in the figure via an ACF (not shown).

As shown in FIG. 11, the LCD panel 40f is substantially the same as the LCD panel 40d of the fourth embodiment except for the interconnect layout of the second interconnects Wb.

As shown in FIG. 11, the source-side SOF 41af is a film substrate having mounted thereon a source driver 44ad containing two amplifier circuits A.

As shown in FIG. 11, the LCD 50f has two first interconnects Wa. One of the first interconnects Wa extends along the lower side of the LCD panel 40f in the figure so as to cross the lower ends of source lines 3 in the figure, and extends to the left end of the source driver 44ad of the source-side SOF 41af in the figure via the gate-side SOF 41bd. The other first interconnect Wa extends along the lower and right sides of the LCD panel 40f in the figure so as to cross the lower ends of the source lines 3 in the figure, and extends to the right end of the source driver 44ad of the source-side SOF 41af in the figure.

As shown in FIG. 11, the LCD 50f further has two second interconnects Wb provided substantially in a frame shape so as to cross the upper ends of the source lines 3 in the figure. As shown in FIG. 11, each of the second interconnects Wb includes a first path Pa that supplies a source signal from the source driver 44ad to the first interconnect Wa in the clockwise direction, and a second path Pb that supplies the source signal from the source driver 44ad to the first interconnect Wa in the counterclockwise direction. As shown in FIG. 11, the inner second interconnect Wb in the figure is connected to the first interconnect Wa extended on the left side of the figure, and the outer second interconnect Wb in the figure is connected to the first interconnect Wa extended on the right side of the figure.

The LCD 50f having the above configuration can be manufactured by changing the interconnect layout in the LCD 50a of the first embodiment, and the first interconnects Wa are connected in advance to the second interconnects Wb. Thus, disconnection of the source lines 3 can be repaired by merely irradiating with laser light the intersections of the source line 3 having a detected disconnection and the first and second interconnects Wa, Wb.

According to the LCD 50f of the present embodiment and the manufacturing method thereof, as in the fourth and fifth embodiments, there is one source driver 44ad, and thus a signal delay tends to occur according to the position of the disconnected source line 3. However, as in the first embodiment, each of the second interconnects Wb crossing one ends of the source lines 3 is configured so that a source signal from the source driver 44ad is supplied to the first interconnect Wa crossing the other ends of the source lines 3, via the first and second paths Pa, Pb that are different from each other. Thus, the signal delay in the repaired source line 3 can be reduced.

Seventh Embodiment

Figure 12:
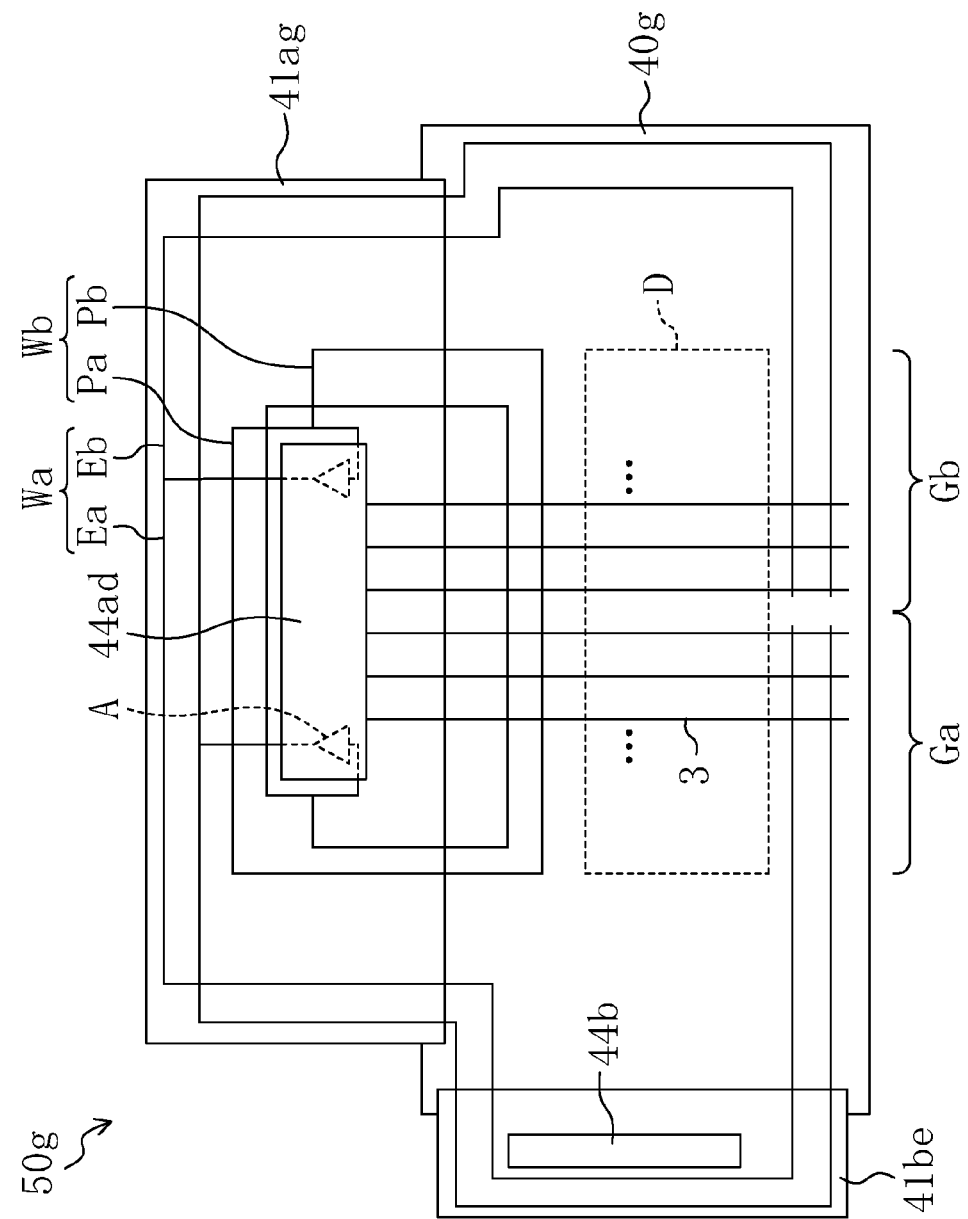
FIG. 12 is a plan view of an LCD 50g of a seventh embodiment.

FIG. 12 is a plan view of an LCD 50g of the present embodiment.

Although each of the first interconnects Wa is provided so as to be extended in one direction in the sixth embodiment, each of the first interconnects Wa is provided so as to be extended in two different directions in the present embodiment.

As shown in FIG. 12, the LCD 50g includes: an LCD panel 40g; a source-side SOF 41ag attached to the upper end of the LCD panel 40g in the figure via an ACF (not shown); and a gate-side SOF 41be attached to the left end of the LCD panel 40g in the figure via an ACF (not shown).

As shown in FIG. 12, the LCD panel 40g is substantially the same as the LCD panel 40f of the sixth embodiment except for the interconnect layout of the first interconnects Wa.

As shown in FIG. 12, the source-side SOF 41ag is a film substrate having mounted thereon a source driver 44ad containing two amplifier circuits A.

As shown in FIG. 12, the LCD 50g has two first interconnects Wa each having a first extended interconnect portion Ea and a second extended interconnect portion Eb. The first extended interconnect portion Ea extends along the lower side of the LCD panel 40g so as to cross the lower ends of source lines 3 in the left interconnect group Ga in the figure, and extends along the left and upper sides of the source-side SOF 41ag in the figure via the gate-side SOF 41be. The second extended interconnect portion Eb extends along the lower and right sides of the LCD panel 40g so as to cross the lower ends of source lines 3 in the right interconnect group Gb in the figure, and extends along the right and upper sides of the source-side SOF 41ag.

As shown in FIG. 12, the LCD 50g further has two interconnects Wb provided substantially in a frame shape so as to cross the upper ends of the source lines 3 in the figure. As shown in FIG. 12, each of the second interconnects Wb has a first path Pa that supplies a source signal from the source driver 44ad to the first interconnect Wa in the clockwise direction, and a second path Pb that supplies the source signal from the source driver 44ad to the first interconnect Wa in the counterclockwise direction. As shown in FIG. 12, the inner second interconnect Wb in the figure is connected to the first interconnect Wa extended on the outer side of the LCD panel 40g in the figure, and the outer second interconnect Wb in the figure is connected to the first interconnect Wa extended on the inner side of the LCD panel 40g in the figure.

The LCD 50g having the above configuration can be manufactured by changing the interconnect layout in the LCD 50a of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnects Wa, Wb.

According to the LCD 50g of the present embodiment and the manufacturing method thereof, as in the fourth to sixth embodiments, there is one source driver 44ad, and thus a signal delay tends to occur according to the position of the disconnected source line 3. However, as in the sixth embodiment, each of the second interconnects Wb crossing one ends of the source lines 3 is configured so that a source signal from the source driver 44ad is supplied to the first interconnect Wa crossing the other ends of the source lines 3, via the first and second paths Pa, Pb that are different from each other. Thus, the signal delay in the repaired source line 3 can be reduced.

According to the LCD 50g of the present embodiment, each of the first interconnects Wa is formed by the first extended interconnect portion Ea and the second extended interconnect portion Eb that are extended in the different directions. This reduces the electrical resistance and the electrical capacitance in each of the first interconnects Wa, whereby the signal delay in the repaired source line 3 can be reduced.

Eighth Embodiment

Figure 13:
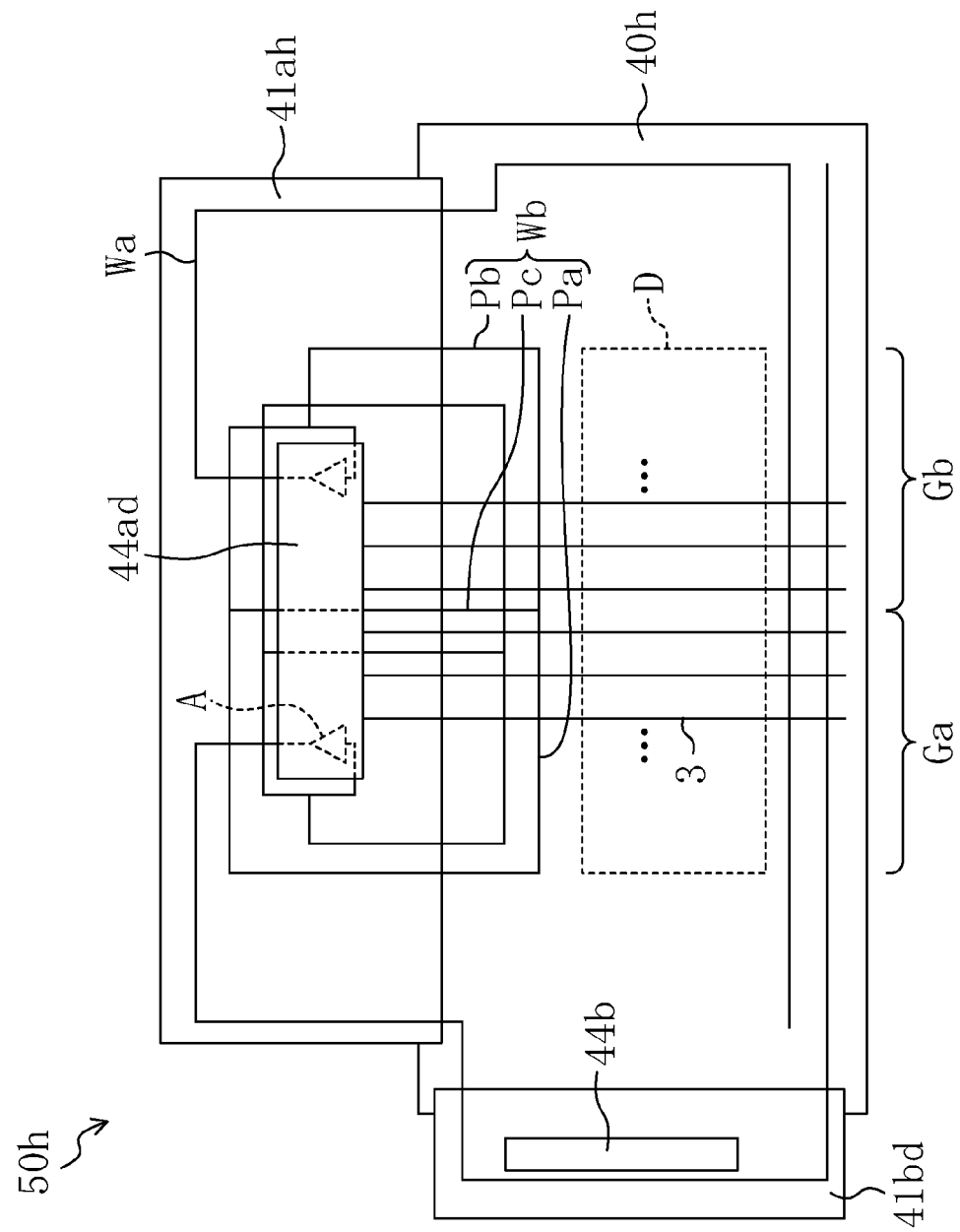
FIG. 13 is a plan view of an LCD 50h of an eighth embodiment.

FIG. 13 is a plan view of an LCD 50h of the present embodiment.

Although each of the second interconnects Wb has two paths in the sixth and seventh embodiments, each of the second interconnects Wb has three paths in the present embodiment.

As shown in FIG. 13, the LCD 50h includes an LCD panel 40h; a source-side SOF 41ah attached to the upper end of the LCD panel 40h in the figure via an ACF (not shown); and a gate-side SOF 41bd attached to the left end of the LCD panel 40h in the figure via an ACF (not shown).

As shown in FIG. 13, the LCD panel 40h is substantially the same as the LCD panel 40f of the sixth embodiment except for the interconnect layout of the second interconnects Wb.

As shown in FIG. 13, the source-side SOF 41ah is a film substrate having mounted thereon a source driver 44ad containing two amplifier circuits A.

As shown in FIG. 13, the LCD 50h has two first interconnects Wa. One of the first interconnects Wa extends along the lower side of the LCD panel 40h in the figure so as to cross the lower ends of source lines 3 in the figure, and extends to the left end of the source driver 44ad of the source-side SOF 41ah in the figure via the gate-side SOF 41bd. The other first interconnect Wa extends along the lower and right sides of the LCD panel 40h in the figure so as to cross the lower ends of the source lines 3 in the figure, and extends to the right end of the source driver 44ad of the source-side SOF 41ah in the figure.

As shown in FIG. 13, the LCD 50h further has two second interconnects Wb each provided substantially in the shape of the figure "8" so as to cross the upper ends of the source lines 3 in the figure. As shown in FIG. 13, each of the second interconnects Wb has: a first path Pa that supplies a source signal from the source driver 44ad to the first interconnect Wa in the clockwise direction; a second path Pb that supplies the source signal from the source driver 44ad to the first interconnect Wa in the counterclockwise direction; and a third path Pc that extends in the middle to supply the source signal from the source driver 44ad to the first interconnect Wa. As shown in FIG. 13, the inner second interconnect Wb in the figure is connected to the first interconnect Wa extended on the left side of the figure, and the outer second interconnect Wb in the figure is connected to the first interconnect Wa extended on the right side of the figure.

The LCD 50h having the above configuration can be manufactured by changing the interconnect layout in the LCD 50a of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnects Wa, Wb.

According to the LCD 50*h* of the present embodiment and the manufacturing method thereof, as in the fourth to seventh embodiments, there is one source driver 44*ad*, and thus a signal delay tends to occur according to the position of the disconnected source line 3. However, each of the second interconnects Wb crossing one ends of the source lines 3 is configured so that a source signal from the source driver 44*ad* is supplied to the first interconnect Wa crossing the other ends of the source lines 3, via the first, second, and third path Pa, Pb, Pc that are different from each other. Thus, the signal delay in the repaired source line 3 can be reduced.

Ninth Embodiment

Figure 14:
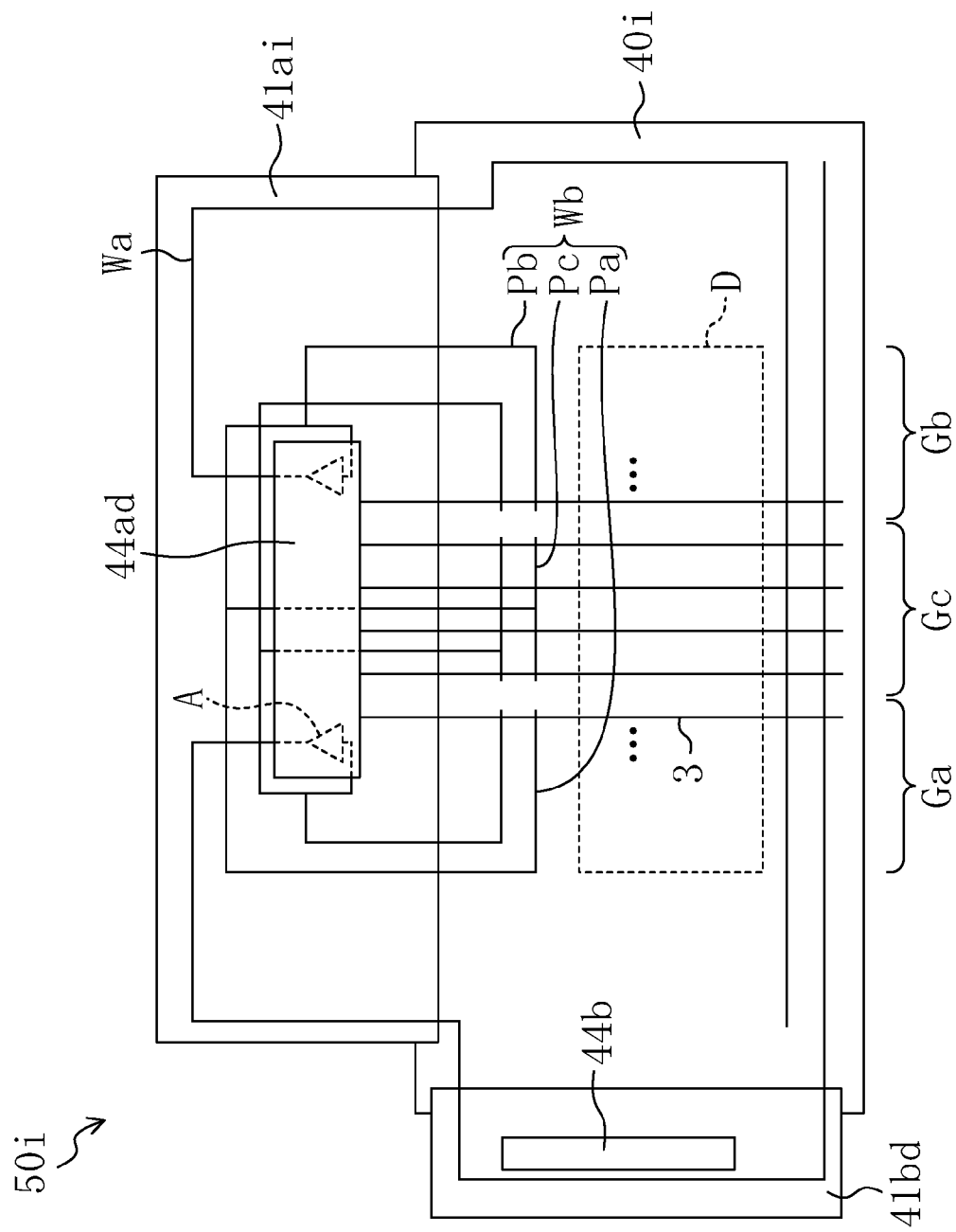
FIG. 14 is a plan view of an LCD 50i of a ninth embodiment.

FIG. 14 is a plan view of an LCD 50*i* of the present embodiment.

Although the three paths of each of the second interconnects Wb are connected together in the eighth embodiment, the three paths of each of the second interconnects Wb are provided so as to be independent of each other in the present embodiment.

As shown in FIG. 14, the LCD 50*i* includes: an LCD panel 40*i*; a source-side SOF 41*ai* attached to the upper end of the LCD panel 40*i* in the figure via an ACF (not shown); and a gate-side SOF 41*bd* attached to the left end of the LCD panel 40*i* in the figure via an ACF (not shown).

As shown in FIG. 14, the LCD panel 40*i* is substantially the same as the LCD panel 40*h* of the eighth embodiment except for the interconnect layout of the second interconnects Wb.

As shown in FIG. 14, the source-side SOF 41*ai* is a film substrate having mounted thereon a source driver 44*ad* containing two amplifier circuits A.

As shown in FIG. 14, the LCD 50*i* has two first interconnects Wa. One of the first interconnects Wa extends along the lower side of the LCD panel 40*i* in the figure so as to cross the lower ends of source lines 3 in the figure, and extends to the left end of the source driver 44*ad* of the source-side SOF 41*ai* in the figure via the gate-side SOF 41*bd*. The other first interconnect Wa extends along the lower and right sides of the LCD panel 40*i* so as to cross the lower ends of the source lines 3 in the figure, and extends to the right end of the source driver 44*ad* of the source-side SOF 41*ai* in the figure.

As shown in FIG. 14, the LCD 50*i* further has two second interconnects Wb. Each of the second interconnects Wb has: a first path Pa provided substantially in an L shape so as to cross the upper ends of the source lines 3 in the left interconnect group Ga in the figure; a second path Pb provided substantially in a U shape so as to cross the upper ends of the source lines 3 in the right interconnect group Gb in the figure; and a third path Pc provided substantially in a T shape so as to cross the upper ends of the source lines 3 in the middle interconnect group Gc in the figure. As shown in FIG. 14, the inner second interconnect Wb in the figure is connected to the first interconnect Wa extended on the left side of the figure, and the outer second interconnect Wb in the figure is connected to the first interconnect Wa extended on the right side of the figure.

The LCD 50*i* having the above configuration can be manufactured by changing the interconnect layout in the LCD 50*a* of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnects Wa, Wb.

According to the LCD 50*i* of the present embodiment and the manufacturing method thereof, as in the fourth to eighth embodiments, there is one source driver 44*ad*, and thus a signal delay tends to occur according to the position of the disconnected source line 3. However, each of the second interconnects Wb crossing one ends of the source lines 3 is configured so that a source signal from the source driver 44*ad* is supplied to the first interconnect Wa crossing the other ends of the source lines 3, via the first, second, and third paths Pa, Pb, Pc that are different from each other. Moreover, the plurality of source lines 3 are substantially equally divided into the three interconnect groups Ga, Gb, Gc each formed by adjoining ones of the source lines 3, and the paths Pa, Pb, Pc of the second interconnects Wb are arranged so as to correspond to these three interconnect groups Ga, Gb, Gc. Thus, as compared to the case where the second interconnects Wb are provided simply in an L shape (see FIG. 21; the time constant of the second interconnect: $\tau=RC$), the electrical resistance of each path Pa, Pb, Pc of the second interconnect Wb is R/3, and the electrical capacitance at the intersection of each path Pa, Pb, Pc of the second interconnect Wb and the source line 3 is C/3, whereby the time constant of each path of the second interconnect is $\tau=RC/9$. Thus, the signal delay in the repaired source line 3 can be reduced.

Tenth Embodiment

Figure 15:
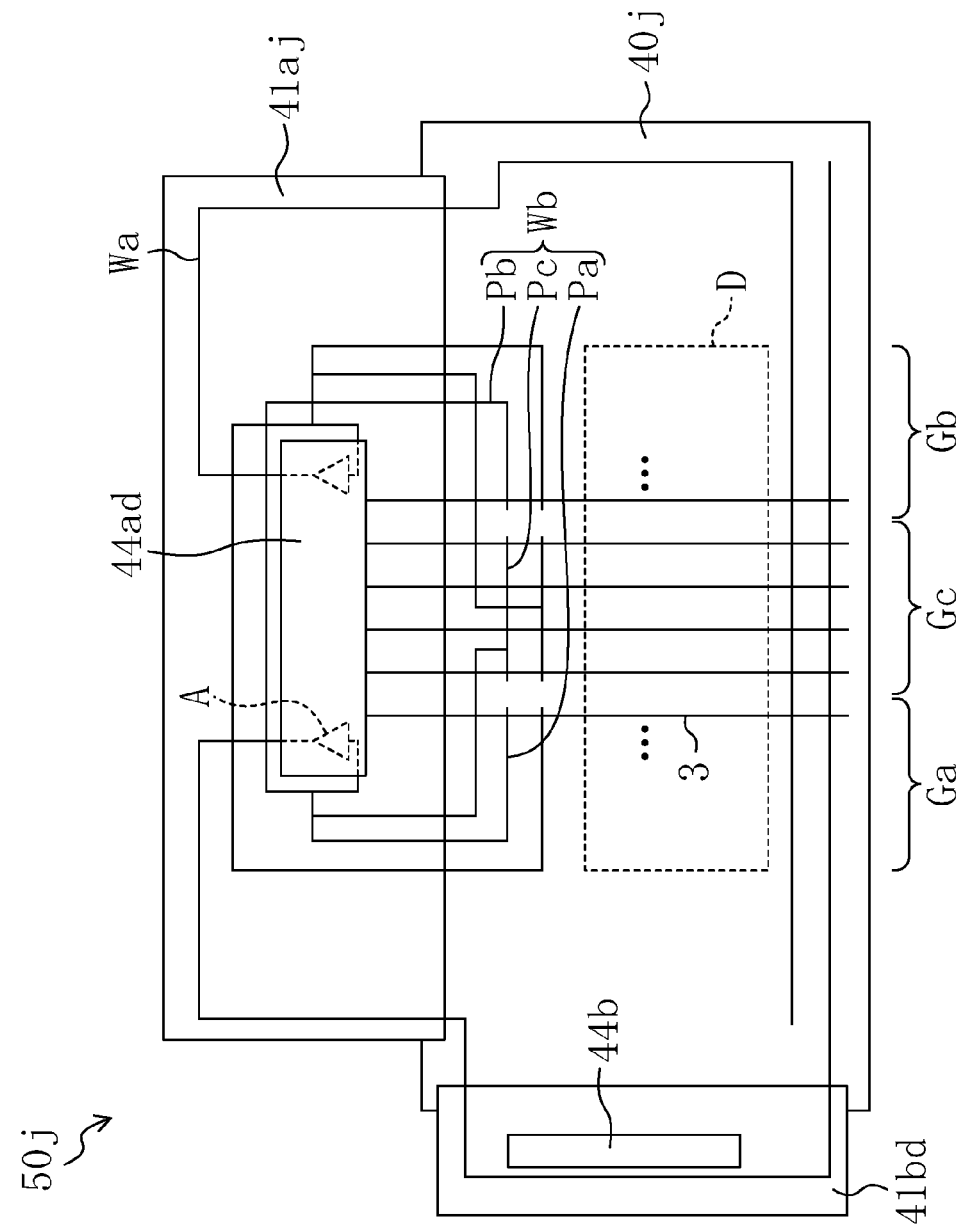
FIG. 15 is a plan view of an LCD 50j of a tenth embodiment.

FIG. 15 is a plan view of an LCD 50*j* of the present embodiment.

Although the third path Pc extends through the central portion of the source driver 44*ad* in the ninth embodiment, the third path Pc extends outside the source driver 44*ad* in the present embodiment.

As shown in FIG. 15, the LCD 50*j* includes: an LCD panel 40*j*: a source-side SOF 41*aj* attached to the upper end of the LCD panel 40*j* in the figure via an ACF (not shown); and a gate-side SOF 41*bd* attached to the left end of the LCD panel 40*j* in the figure via an ACF (not shown).

As shown in FIG. 15, the LCD panel 40*j* is substantially the same as the LCD panel 40*i* of the ninth embodiment except for the interconnect layout of the second interconnects Wb.

As shown in FIG. 15, the source-side SOF 41*aj* is a film substrate having mounted thereon a source driver 44*ad* containing two amplifier circuits A.

As shown in FIG. 15, the LCD 50*j* has two first interconnects Wa. One of the first interconnects Wa extends along the lower side of the LCD panel 40*j* in the figure so as to cross the lower ends of source lines 3 in the figure, and extends to the left end of the source driver 44*ad* of the source-side SOF 41*aj* in the figure via the gate-side SOF 41*bd*. The other first interconnect Wa extends along the lower and right sides of the LCD panel 40*j* in the figure so as to cross the lower ends of the source lines 3 in the figure, and extends to the right end of the source driver 44*ad* of the source-side SOF 41*aj* in the figure.

As shown in FIG. 15, the LCD 50*j* further has two second interconnects Wb. Each of the second interconnects Wb has: a first path Pa provided substantially in an L shape so as to cross the upper ends of the source lines 3 in the left interconnect group Ga in the figure; a second path Pb provided substantially in a U shape so as to cross the upper ends of the source lines 3 in the right interconnect group Gb in the figure; and a third path Pc provided substantially in a W shape so as to cross the upper ends of the source lines 3 in the middle interconnect group Gc in the figure. As shown in FIG. 15, the inner second interconnect Wb in the figure is connected to the first interconnect Wa extended on the left side of the figure, and the outer second interconnect Wb in the figure is connected to the first interconnect Wa extended on the right side of the figure.

The LCD 50*j* having the above configuration can be manufactured by changing the interconnect layout in the LCD 50*a* of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnect Wa, Wb.

According to the LCD 50*j* of the present embodiment and the manufacturing method thereof, as in the fourth to ninth embodiments, there is one source driver 44*ad*, and thus a signal delay tends to occur according to the position of the disconnected source line 3. However, as in the ninth embodiment, each of the second interconnects Wb crossing one ends of the source lines 3 is configured so that a source signal from the source driver 44*ad* is supplied to the first interconnect Wa crossing the other ends of the source lines 3, via the first, second, and third paths Pa, Pb, Pc that are different from each other. Thus, the signal delay in the repaired source line 3 can be reduced.

Eleventh Embodiment

Figure 16:
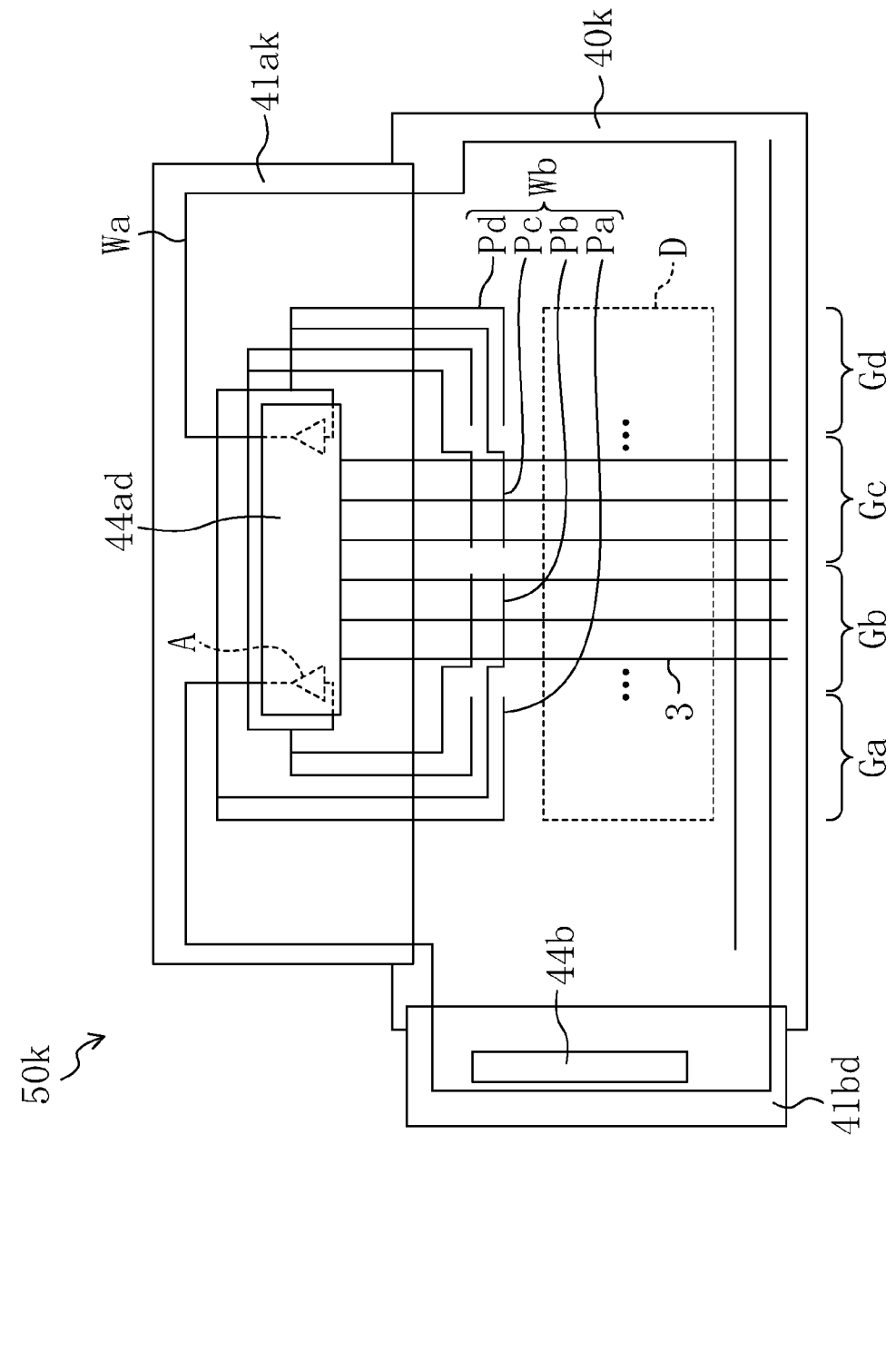
FIG. 16 is a plan view of an LCD 50k of an eleventh embodiment.

FIG. 16 is a plan view of an LCD 50*k* of the present embodiment.

Although each of the second interconnects Wb has three paths in the ninth and tenth embodiments, each of the second interconnects Wb has four paths in the present embodiment.

As shown in FIG. 16, the LCD 50*k* includes: an LCD panel 40*k*; a source-side SOF 41*ak* attached to the upper end of the LCD panel 40*k* in the figure via an ACF (not shown); and a gate-side SOF 41*bd* attached to the left end of the LCD panel 40*k* in the figure via an ACF (not shown).

As shown in FIG. 16, the LCD panel 40*k* is substantially the same as the LCD panel 40*j* of the tenth embodiment except for the interconnect layout of the second interconnects Wb.

As shown in FIG. 16, the source-side SOF 41*ak* is a film substrate having mounted thereon a source driver 44*ad* containing two amplifier circuits A.

As shown in FIG. 16, the LCD 50*k* has two first interconnects Wa. One of the first interconnects Wa extends along the lower side of the LCD panel 40*k* in the figure so as to cross the lower ends of source lines 3 in the figure, and extends to the left end of the source driver 44*ad* of the source-side SOF 41*ak* in the figure via the gate-side SOF 41*bd*. The other first interconnect Wa extends along the lower and right sides of the LCD panel 40*k* in the figure so as to cross the lower ends of the source lines 3 in the figure, and extends to the right end of the source driver 44*ad* of the source-side SOF 41*ak* in the figure.

As shown in FIG. 16, the LCD 50*k* further has two second interconnects Wb. Each of the second interconnects Wb has: a first path Pa provided substantially in an L shape so as to cross the upper ends of the source lines 3 in the leftmost interconnect group Ga in the figure; a second path Pb provided substantially in a W shape so as to cross the upper ends of the source lines 3 in the second interconnect group Gb from the left in the figure; a third path Pc provided substantially in a W shape so as to cross the upper ends of the source lines in the third interconnect group Gc from the left in the figure; and a fourth path Pd provided substantially in a U shape so as to cross the upper ends of the source lines 3 in the rightmost interconnect group Gd in the figure. As shown in FIG. 16, the inner second interconnect Wb in the figure is connected to the first interconnect Wa extended on the left side of the figure, and the outer second interconnect Wb in the figure is connected to the first interconnect Wa extended on the right side of the figure.

The LCD 50*k* having the above configuration can be manufactured by changing the interconnect layout in the LCD 50*a* of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnects Wa, Wb.

According to the LCD 50*k* of the present embodiment and the manufacturing method thereof, as in the fourth to tenth embodiments, there is one source driver 44*ad*, and thus a signal delay tends to occur according to the position of the disconnected source line 3. However, each of the second interconnects Wb crossing one ends of the source lines 3 is configured so that a source signal from the source driver 44*ad* is supplied to the first interconnect Wa crossing the other ends of the source lines 3, via the first, second, third, and fourth paths Pa, Pb, Pc, Pd that are different from each other. Moreover, the plurality of source lines 3 are substantially equally divided into the four interconnect groups Ga, Gb, Gc, Gd each formed by adjoining ones of the source lines 3, and the paths Pa, Pb, Pc, Pd of the second interconnects Wb are arranged so as to correspond to these four interconnect groups Ga, Gb, Gc, Gd. Thus, as compared to the case where the second interconnects Wb are provided simply in an L shape (see FIG. 21; the time constant of the second interconnect: $\tau = RC$), the electrical resistance of each path Pa, Pb, Pc, Pd of the second interconnect Wb is R/4, and the electrical capacitance at the intersection of each path Pa, Pb, Pc, Pd of the second interconnect Wb and the source line 3 is C/4, whereby the time constant of each path of the second interconnect is $\tau = RC/16$. Thus, the signal delay in the repaired source line 3 can be reduced.

Twelfth Embodiment

Figure 17:
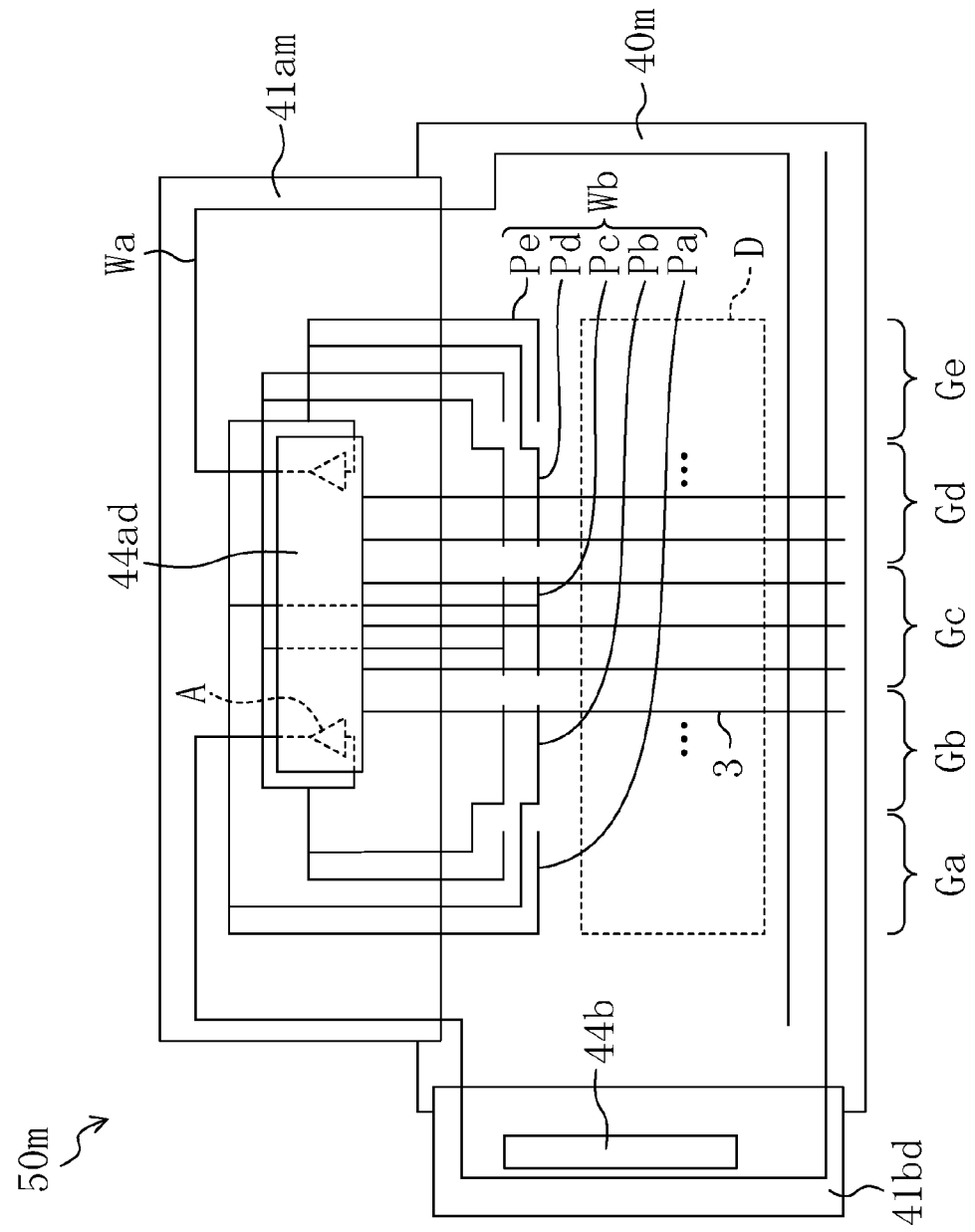
FIG. 17 is a plan view of an LCD 50m of a twelfth embodiment.

FIG. 17 is a plan view of an LCD 50*m* of the present embodiment.

Although each of the second interconnects Wb has four paths in the eleventh embodiment, each of the second interconnects Wb has five paths in the present embodiment.

As shown in FIG. 17, the LCD 50*m* includes: an LCD panel 40*m*; a source-side SOF 41*am* attached to the upper end of the LCD panel 40*m* in the figure via an ACF (not shown); and a gate-side SOF 41*bd* attached to the left end of the LCD panel 40*m* in the figure via an ACF (not shown).

As shown in FIG. 17, the LCD panel 40*m* is substantially the same as the LCD panel 40*k* of the eleventh embodiment except for the interconnect layout of the second interconnects Wb.

As shown in FIG. 17, the source-side SOF 41*am* is a film substrate having mounted thereon a source driver 44*ad* containing two amplifier circuits A.

As shown in FIG. 17, the LCD 50*m* has two first interconnects Wa. One of the first interconnects Wa extends along the lower side of the LCD panel 40*m* in the figure so as to cross the lower ends of source lines 3 in the figure, and extends to the left end of the source driver 44*ad* of the source-side SOF 41*am* in the figure via the gate-side SOF 41*bd*. The other first interconnect Wa extends along the lower and right sides of the LCD panel 40*m* in the figure so as to cross the lower ends of the source lines 3 in the figure, and extends to the right end of the source driver 44*ad* of the source-side SOF 41*am* in the figure.

As shown in FIG. 17, the LCD 50m further has two second interconnects Wb. Each of the second interconnects Wb has: a first path Pa provided substantially in an L shape so as to cross the upper ends of the source lines 3 in the leftmost interconnect group Ga in the figure; a second path Pb provided substantially in a W shape so as to cross the upper ends of the source lines 3 in the second interconnect group Gb from the left in the figure; a third path Pc provided substantially in a T shape so as to cross the upper ends of the source lines 3 in the middle interconnect group Gc in the figure; a fourth path Pd provided substantially in a W shape so as to cross the upper ends of the source lines 3 in the second interconnect group Gd from the right in the figure; and a fifth path Pe provided substantially in a U shape so as to cross the upper ends of the source lines 3 in the rightmost interconnect group Ge in the figure. As shown in FIG. 17, the inner second interconnect Wb in the figure is connected to the first interconnect Wa extended on the left side of the figure, and the outer second interconnect Wb in the figure is connected to the first interconnect Wa extended on the right side of the figure.

The LCD 50m having the above configuration can be manufactured by changing the interconnect layout in the LCD 50a of the first embodiment, and the first interconnects Wa are connected in advance to the second interconnects Wb. Thus, disconnections of the source lines 3 can be repaired by merely irradiating with laser light the intersections of the source line 3 having a detected disconnection and the first and second interconnects Wa, Wb.

According to the LCD 50m of the present embodiment and the manufacturing method thereof, as in the fourth to eleventh embodiments, there is one source driver 44ad, and thus a signal delay tends to occur according to the position of the disconnected source line 3. However, each of the second interconnects Wb crossing one ends of the source lines 3 is configured so that a source signal from the source driver 44ad is supplied to the first interconnect Wa crossing the other ends of the source lines 3, via the first, second, third, fourth, and fifth paths Pa, Pb, Pc, Pd, Pe that are different from each other. Moreover, the plurality of source lines 3 are substantially equally divided into the five interconnect groups Ga, Gb, Gc, Gd, Ge each formed by adjoining ones of the source lines 3, and the paths Pa, Pb, Pc, Pd, Pe of the second interconnects Wb are arranged so as to correspond to these five interconnect groups Ga, Gb, Gc, Gd, Ge. Thus, as compared to the case where the second interconnects Wb are provided simply in an L shape (see FIG. 21; the time constant of the second interconnect: $\tau=RC$), the electrical resistance of each path Pa, Pb, Pc, Pd, Pe of the second interconnect Wb is R/5, and the electrical capacitance at the intersection of each path Pa, Pb, Pc, Pd, Pe of the second interconnect Wb and the source line 3 is C/5, whereby the time constant of each path of the second interconnect is $\tau=RC/25$. Thus, the signal delay in the repaired source line 3 can be reduced.

Thirteenth Embodiment

Figure 18:
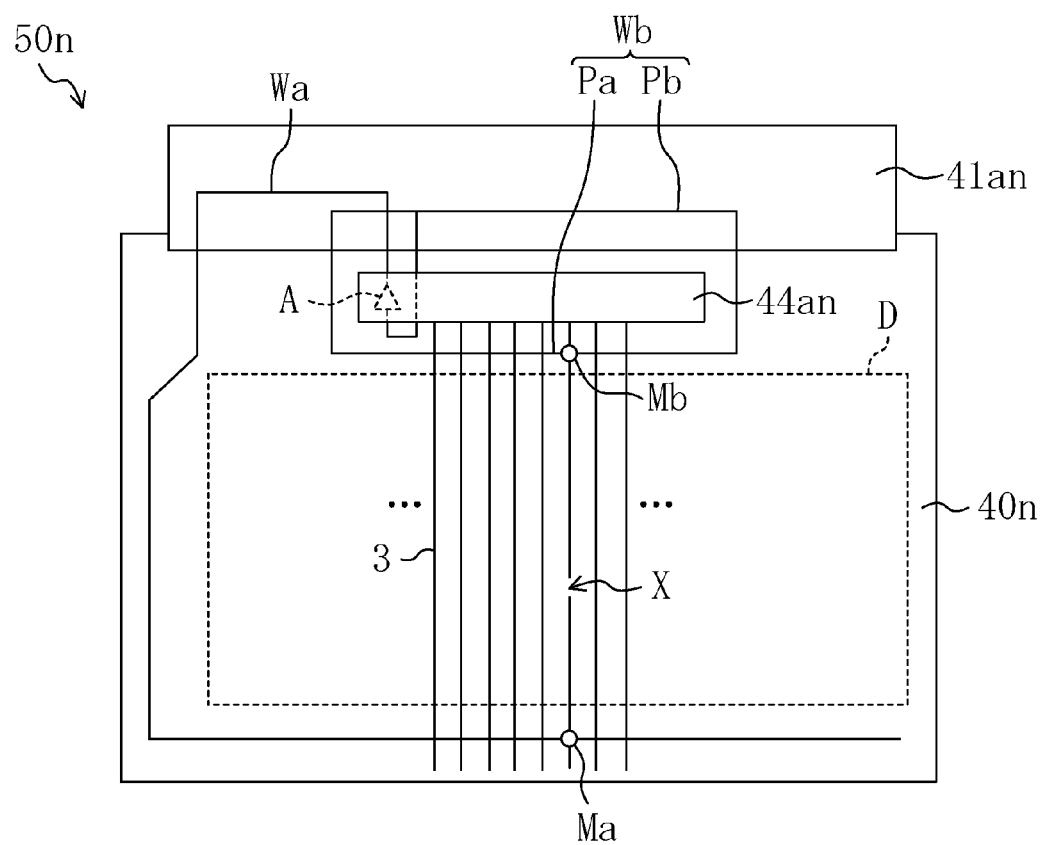
FIG. 18 is a plan view of an LCD 50n of a thirteenth embodiment.

FIG. 18 is a plan view of an LCD 50n of the present embodiment.

Although the source driver is provided on the film substrate in the above embodiments, a source driver 44an is provided on an LCD panel 40n in the present embodiment.

As shown in FIG. 18, the LCD 50n includes: the LCD panel 40n; a source-side FPC 41an attached to the upper end of the LCD panel 40n in the figure via an ACF (not shown); and a gate-side FPC (not shown) attached to the left end of the LCD panel 40n in the figure via an ACF (not shown).

As shown in FIG. 18, the LCD panel 40n has the source driver 44an mounted along its upper side in the figure, and is substantially the same as the LCD panel 40a of the first embodiment except for the interconnect layout of the first and second interconnects Wa, Wb. Source lines 3 are connected to the source driver 44an.

As shown in FIG. 18, the source-side FPC 41an is a film substrate for connecting the LCD panel 40n to the outside.

As shown in FIG. 18, the LCD 50n has a first interconnect Wa extending along the lower and left sides of the LCD panel 40n in the figure so as to cross the lower ends of the source lines 3 in the figure, and extending to the left end of the source driver 44an in the figure via the source-side FPC 41an. As shown in FIG. 18, the first interconnect Wa is configured so as to extend through an amplifier circuit A in the source driver 44an.

As shown in FIG. 18, the LCD 50n further has a second interconnect Wb provided substantially in a frame shape so as to cross the upper ends of the source lines 3 in the figure. As shown in FIG. 18, the second interconnect Wb has a first path Pa that supplies a source signal from the source driver 44an to the first interconnect Wa in the clockwise direction, and a second path Pb that supplies the source signal from the source driver 44an to the first interconnect Wa in the counterclockwise direction.

The LCD 50n having the above configuration can be manufactured by changing the interconnect layout in the LCD 50a of the first embodiment, and the first interconnect Wa is connected in advance to the second interconnect Wb. Thus, disconnections of the source lines 3 can be repaired by merely irradiating with laser light the intersection Ma of the source line 3 having a detected disconnection and the first interconnect Wa, and the intersection Mb of that source line 3 and the second interconnect Wb.

According to the LCD 50n of the present embodiment and the manufacturing method thereof, as in the fifth embodiment, the second interconnect Wb crossing one ends of the source lines 3 is configured so that a source signal from the source driver 44an is supplied to the first interconnect Wa crossing the other ends of the source lines 3, via the first and second paths Pa, Pb that are different from each other. Thus, the signal delay in the repaired source line 3 can be reduced.

According to the LCD 50n of the present embodiment, the source driver 44an is provided on the LCD panel 40n, and the first interconnect Wa and the second interconnect Wb are provided so as to extend through the source-side FPC 41an. Thus, the interconnect layout around the source driver 44an can be simplified.

Fourteenth Embodiment

Figure 19:
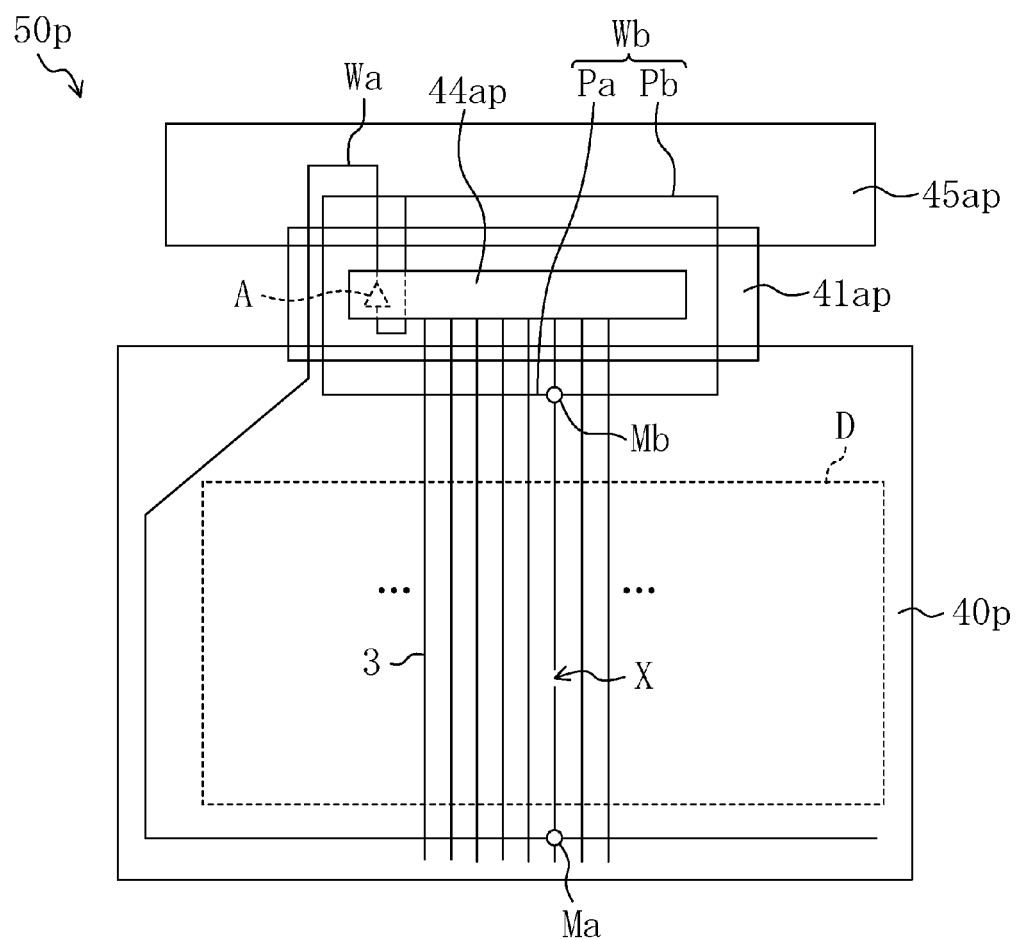
FIG. 19 is a plan view of an LCD 50p of a fourteenth embodiment.

FIG. 19 is a plan view of an LCD 50p of the present embodiment. Although the first interconnect Wa and the second interconnect Wb extend through the source-side FPC 41an in the thirteenth embodiment, the first interconnect Wa and the second interconnect Wb extend through a source-side SOF 41ap and a source-side PWB 45ap in the present embodiment.

As shown in FIG. 19, the LCD 50p includes: an LCD panel 40p; the source-side SOF 41ap attached to the upper end of the LCD panel 40p in the figure via an ACF (not shown); the source-side PWB 45ap attached to the upper end of the source-side SOF 41ap in the figure via an ACF (not shown); and a gate-side FPC (not shown) attached to the left end of the LCD panel 40p in the figure via an ACF (not shown).

As shown in FIG. 19, the LCD panel 40p is substantially the same as the LCD panel 40a of the first embodiment except for the interconnect layout of the first and second interconnects Wa, Wb.

As shown in FIG. 19, the source-side SOF 41ap is a film substrate having mounted thereon a source driver 44ap containing an amplifier circuit A. Source lines 3 are connected to the source driver 44ap.

As shown in FIG. 19, the LCD 50p has a first interconnect Wa extending along the lower and left sides of the LCD panel 40p in the figure so as to cross the lower ends of the source lines 3 in the figure, and extending to the left end of the source driver 44ap via the source-side SOF 41ap and the source-side PWB 45ap. As shown in FIG. 19, the first interconnect Wa is configured so as to extend through the amplifier circuit A in the source driver 44ap.

As shown in FIG. 19, the LCD 50p has a second interconnect Wb provided substantially in a frame shape so as to cross the upper ends of the source lines 3 in the figure. As shown in FIG. 19, the second interconnect Wb has a first path Pa that supplies a source signal from the source driver 44ap to the first interconnect Wa in the clockwise direction, and a second path Pb that supplies the source signal from the source driver 44ap to the first interconnect Wa in the counterclockwise direction.

The LCD 50p having the above configuration can be manufactured by changing the interconnect layout in the LCD 50a of the first embodiment, and the first interconnect Wa is connected in advance to the second interconnect Wb. Thus, disconnections of the source lines 3 can be repaired by merely irradiating with laser light the intersection Ma of the source line 3 having a detected disconnection and the first interconnect Wa, and the intersection Mb of that source line 3 and the second interconnect Wb.

According to the LCD 50p of the present embodiment and the manufacturing method thereof, as in the fifth embodiment, the second interconnect Wb crossing one ends of the source lines 3 is configured so that a source signal from the source driver 44ap is supplied to the first interconnect Wa crossing the other ends of the source lines 3, via the first and second paths Pa, Pb that are different from each other. Thus, the signal delay in the repaired source line 3 can be reduced.

According to the LCD 50p of the present embodiment, the source driver 44ap is provided on the source-side SOF 41ap, and the first interconnect Wa and the second interconnect Wb are provided so as to extend through the source-side SOF 41ap and the source-side PWB 45ap. Thus, the interconnect layout in the source-side SOF 41ap can be simplified.

Fifteenth Embodiment

Figure 20:
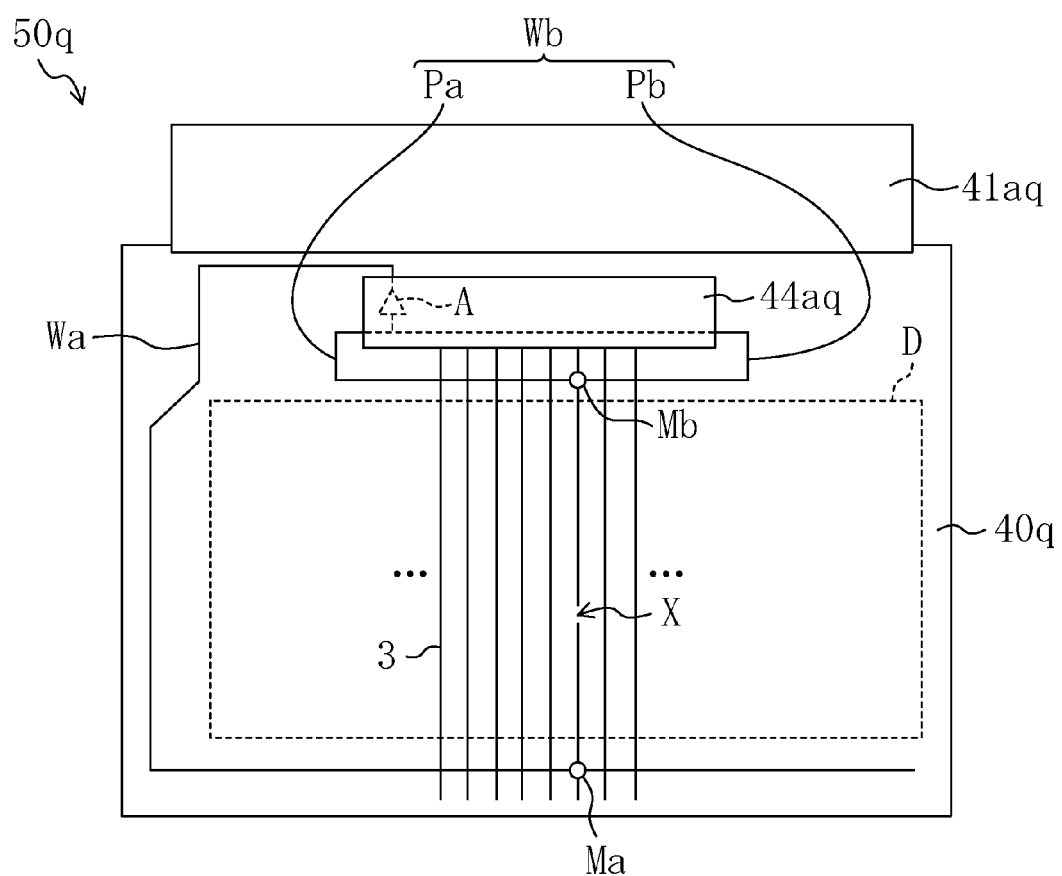
FIG. 20 is a plan view of an LCD 50q of a fifteenth embodiment.

FIG. 20 is a plan view of an LCD 50q of the present embodiment.

Although the first and second interconnects Wa, Wb extend through the source-side FPC 41an in the thirteenth embodiment, and the first and second interconnects Wa, Wb extend through the source-side SOF 41ap and the source-side PWB 45ap in the fourteenth embodiment, the first and second interconnects Wa, Wb are arranged only in an LCD panel 40q in the present embodiment.

As shown in FIG. 20, the LCD 50q includes: the LCD panel 40q; a source-side FPC 41aq attached to the upper end of the LCD panel 40q in the figure via an ACF (not shown); and a gate-side FPC (not shown) attached to the left end of the LCD panel 40q in the figure via an ACF (not shown).

As shown in FIG. 20, the LCD panel 40q has a source driver 44aq mounted along its upper side in the figure, and is substantially the same as the LCD panel 40n of the thirteenth embodiment except for the interconnect layout of the first and second interconnects Wa, Wb.

As shown in FIG. 20, the source-side FPC 41aq is a film substrate for connecting the LCD panel 40q to the outside.

As shown in FIG. 20, the LCD 50q has a first interconnect Wa extending along the lower and left sides of the LCD panel 40q in the figure so as to cross the lower ends of source lines 3 in the figure, and extending to the left end of the source driver 44aq. As shown in FIG. 20, the first interconnect Wa is configured so as to extend through an amplifier circuit A in the source driver 44aq.

As shown in FIG. 20, the LCD 50q further has a second interconnect Wb provided substantially in a frame shape so as to cross the upper ends of the source lines 3 in the figure. As shown in FIG. 20, the second interconnect Wb has a first path Pa that supplies a source signal from the source driver 44aq to the first interconnect Wa in the clockwise direction, and a second path Pb that supplies the source signal from the source driver 44aq to the first interconnect Wa in the counterclockwise direction.

The LCD 50q having the above configuration can be manufactured by changing the interconnect layout in the LCD 50a of the first embodiment, and the first interconnect Wa is connected in advance to the second interconnect Wb. Thus, disconnections of the source line 3 can be repaired by merely irradiating with laser light the intersection Ma of the source line 3 having a detected disconnection and the first interconnect Wa, and the intersection Mb of that source line 3 and the second interconnect Wb.

According to the LCD 50q of the present embodiment and the manufacturing method thereof, as in the fifth embodiment, the second interconnect Wb crossing one ends of the source lines 3 is configured so that a source signal from the source driver 44aq is supplied to the first interconnect Wa crossing the other ends of the source lines 3, via the first and second paths Pa, Pb that are different from each other. Thus, the signal delay in the repaired source line 3 can be reduced.

According to the LCD 50q of the present embodiment, since the source driver 44aq, the first interconnect Wa, and the second interconnect Wb are provided on the LCD panel 40q, the interconnect layout in the source-side FPC 41aq attached to the LCD panel 40q can be simplified.

The above embodiments are described with respect to an LCD and a manufacturing method thereof in which disconnections are repaired after fabricating an LCD panel. However, in the present invention, disconnections may be repaired after fabricating an active matrix substrate of the LCD panel 40q of the fifteenth embodiment. In this case, the active matrix substrate may form an LCD by enclosing a liquid crystal layer between the active matrix substrate itself and a counter substrate, or may form, e.g., a sensor substrate such as an X-ray sensor, which reads the electrical charge held in each pixel electrode. Note that in the latter case, neither a liquid crystal layer nor a counter substrate for enclosing the liquid crystal layer is required.

Although an LCD is described as a display device in the above embodiments, the present invention is also applicable to other display devices such as an organic electroluminescence (EL) display and a field emission display (FED).

In the above embodiments, source lines are described as display interconnects in which disconnections are to be repaired. However, the present invention is applicable not only to repairing of disconnections of gate lines, but also to repairing of short-circuits between the gate line and the source line. In the case where the gate line and the source line are short-circuited together, the gate line or the source line is cut by laser radiation so that the short-circuited part is interposed between the portions irradiated with laser light, thereby disconnecting the gate line or the source line. Then, the disconnection of the gate line or the source line is repaired as described in the above embodiments.

Although each of the first and second interconnects is formed integrally in the LCD panel in the above embodiments, each of the first and second interconnects may be formed by a plurality of interconnect portions that can be connected together.

The first to fifth embodiments are described with respect to the configuration in which the first and second paths Pa, Pb of the second interconnect Wb are separated from each other at a central position of the source driver. However, the position where the first and second paths Pa, Pb are separated from each other may be adjusted as appropriate so that the load (the product of the electrical resistance and the electrical capacitance) placed on each path is the same when disconnections are repaired at both ends of the interconnect group of the source lines.

INDUSTRIAL APPLICABILITY

As described above, the present invention is capable of reducing a signal delay in display interconnects in which disconnections have been repaired. Thus, the present invention is useful for small and medium sized devices for use in personal navigation devices, industrial equipment, information terminals, etc, for which reduction in the number of source drivers is desired, and is also useful for LCDs for use in laptop or notebook computers, monitors, LCD televisions, etc.

DESCRIPTION OF REFERENCE CHARACTERS

A Amplifier Circuit
Ba-Be Block
Ea First Extended Interconnect Portion
Eb Second Extended Interconnect Portion
Ga-Ge Interconnect Group
L Laser Light
Pa-Pe Path
Wa First Interconnect
Wb Second Interconnect
Source Line (Display Interconnect)
20a Active Matrix Substrate
40a-40k, 40m, 40n, 40p, 40q LCD Panel
41aa Source-Side FPC (Film Substrate)
41ab-41ak, 41am, 41an, 41ap Source-Side SOF (Film Substrate)
41aq Source-Side FPC (Film Substrate)
44a Source Driver (Drive Circuit)
45aa, 45ap Source-Side PWB (Printed Wiring Board)
50a-50k, 50m, 50n, 50p, 50q LCD

The invention claimed is:

1. A display device, comprising:
a display panel having a plurality of display interconnects provided so as to extend parallel to each other;
a drive circuit provided at one ends of the display interconnects, and connected to the display interconnects;
a first interconnect provided so as to cross the other ends of the display interconnects in an insulating state; and
a second interconnect provided so as to cross the one ends of the display interconnects in an insulating state, and so as to be connected to the first interconnect,
the display device being configured so that a display signal from the drive circuit is supplied to the other side of the display interconnect sequentially through the second interconnect and the first interconnect in this order via an amplifier circuit, wherein
the second interconnect is configured so that the display signal from the drive circuit is supplied to the first interconnect via a plurality of paths that are different from each other.

2. The display device of claim 1, wherein
the plurality of paths are provided so as to be independent of each other.

3. The display device of claim 1, wherein
the amplifier circuit is contained in the drive circuit.

4. The display device of claim 1, wherein
multiple ones of the amplifier circuit are contained in the drive circuit, and
the first interconnect and the second interconnect are provided for each of the amplifier circuits.

5. The display device of claim 1, wherein
the plurality of display interconnects are divided into a plurality of blocks each formed by adjoining ones of the display interconnects, and
the drive circuit is provided for each of the blocks.

6. The display device of claim 1, wherein
the drive circuit is a single drive circuit.

7. The display device of claim 6, wherein
multiple ones of the amplifier circuit are contained in the drive circuit, and
the first interconnect and the second interconnect are provided for each of the amplifier circuits.

8. The display device of claim 7, wherein
each of the second interconnects is provided so that the plurality of paths are independent of each other.

9. The display device of claim 7, wherein
each of the first interconnects is formed by a first extended interconnect portion and a second extended interconnect portion that are extended in different directions from each other, and
the first extended interconnect portion crosses one interconnect group that forms the plurality of display interconnects, and the second extended interconnect portion crosses the other interconnect group that forms the plurality of display interconnects.

10. The display device of claim 1, wherein
the drive circuit is provided on the display panel,
a film substrate is attached to the display panel, and
the first interconnect and the second interconnect are provided so as to extend through the film substrate.

11. The display device of claim 1, wherein
a film substrate is attached to the display panel,
the drive circuit is provided on the film substrate, and
a printed wiring board is attached to the film substrate, and
the first interconnect and the second interconnect are provided so as to extend through the film substrate and the printed wiring board.

12. The display device of claim 1, wherein
the drive circuit, the first interconnect, and the second interconnect are provided on the display panel.

13. A display device, comprising:
a display panel having a plurality of display interconnects provided so as to extend parallel to each other;
a drive circuit provided at one ends of the display interconnects, and connected to the display interconnects;
a first interconnect provided so as to cross the other ends of the display interconnects in an insulating state, and having an amplifier circuit; and a second interconnect provided so as to cross the one ends of the display interconnects in an insulating state, and so as to be connected to the first interconnect, the display device being configured so that a display signal from the drive circuit is supplied to the other side of the display interconnect sequentially through the second interconnect and the first interconnect in this order, wherein the second interconnect is configured so that the display signal from the drive circuit is supplied to the first interconnect via a plurality of paths that are different from each other.

14. The display device of claim 13, wherein the plurality of paths are provided so as to be independent of each other.

15. The display device of claim 13, wherein the plurality of display interconnects are divided into a plurality of blocks each formed by adjoining ones of the display interconnects, and the drive circuit is provided for each of the blocks.

16. The display device of claim 13, wherein the drive circuit is a single drive circuit.

17. The display device of claim 13, wherein
the drive circuit is provided on the display panel,
a film substrate is attached to the display panel, and
the first interconnect and the second interconnect are provided so as to extend through the film substrate.

18. The display device of claim 13, wherein
a film substrate is attached to the display panel,
the drive circuit is provided on the film substrate, and
a printed wiring board is attached to the film substrate, and
the first interconnect and the second interconnect are provided so as to extend through the film substrate and the printed wiring board.

19. The display device of claim 13, wherein the drive circuit, the first interconnect, and the second interconnect are provided on the display panel.

20. A method for manufacturing a display device including
a display panel having a plurality of display interconnects provided so as to extend parallel to each other,
a drive circuit provided at one ends of the display interconnects, and connected to the display interconnects,
a first interconnect provided so as to cross the other ends of the display interconnects in an insulating state, and
a second interconnect provided so as to cross the one ends of the display interconnects in an insulating state, and so as to be connected to the first interconnect, where
when any of the display interconnects is disconnected, a display signal from the drive circuit is supplied to the other side of the disconnected display interconnect sequentially through the second interconnect and the first interconnect in this order via an amplifier circuit, and
the second interconnect is configured so that the display signal from the drive circuit is supplied to the first interconnect via a plurality of paths that are different from each other, the method comprising:
a disconnection detecting step of detecting presence of any disconnection in the display interconnects; and
a disconnection repairing step of irradiating with laser light an intersection of the other end of the display interconnect having the disconnection detected in the disconnection detecting step and the first interconnect, and an intersection of the one end of the display interconnect and the second interconnect.

21. The method of claim 20, wherein
in the disconnection repairing step, a connection of the plurality of paths of the second interconnect other than the path connected to the one end of the display interconnect is removed.

22. The method of claim 20, wherein
a part of the first interconnect located beyond the display interconnect having the disconnection detected in the disconnection detecting step is cut in the disconnection repairing step.

23. A method for manufacturing a display device including
a display panel having a plurality of display interconnects provided so as to extend parallel to each other,
a drive circuit provided at one ends of the display interconnects, and connected to the display interconnects,
a first interconnect provided so as to cross the other ends of the display interconnects in an insulating state, and having an amplifier circuit, and
a second interconnect provided so as to cross the one ends of the display interconnects in an insulating state, and so as to be connected to the first interconnect, where
when any of the display interconnects is disconnected, a display signal from the drive circuit is supplied to the other side of the disconnected display interconnect sequentially through the second interconnect and the first interconnect in this order, and
the second interconnect is configured so that the display signal from the drive circuit is supplied to the first interconnect via a plurality of paths that are different from each other, the method comprising:
a disconnection detecting step of detecting presence of any disconnection in the display interconnects; and
a disconnection repairing step of irradiating with laser light an intersection of the other end of the display interconnect having the disconnection detected in the disconnection detecting step and the first interconnect, and an intersection of the one end of the display interconnect and the second interconnect.

24. The method of claim 23, wherein
in the disconnection repairing step, a connection of the plurality of paths of the second interconnect other than the path connected to the one end of the display interconnect is removed.

25. The method of claim 23, wherein
a part of the first interconnect located beyond the display interconnect having the disconnection detected in the disconnection detecting step is cut in the disconnection repairing step.

26. An active matrix substrate, comprising:
a plurality of display interconnects provided so as to extend parallel to each other;
a drive circuit provided at one ends of the display interconnects, and connected to the display interconnects;
a first interconnect provided so as to cross the other ends of the display interconnects in an insulating state; and
a second interconnect provided so as to cross the one ends of the display interconnects in an insulating state, and so as to be connected to the first interconnect,
the active matrix substrate being configured so that a display signal from the drive circuit is supplied to the other side of the display interconnect sequentially through the second interconnect and the first interconnect in this order via an amplifier circuit, wherein
the second interconnect is configured so that the display signal from the drive circuit is supplied to the first interconnect via a plurality of paths that are different from each other.

27. An active matrix substrate, comprising:
a plurality of display interconnects provided so as to extend parallel to each other;
a drive circuit provided at one ends of the display interconnects, and connected to the display interconnects;
a first interconnect provided so as to cross the other ends of the display interconnects in an insulating state, and having an amplifier circuit; and
a second interconnect provided so as to cross the one ends of the display interconnects in an insulating state, and so as to be connected to the first interconnect,
the active matrix substrate being configured so that a display signal from the drive circuit is supplied to the other side of the display interconnect sequentially through the second interconnect and the first interconnect in this order, wherein
the second interconnect is configured so that the display signal from the drive circuit is supplied to the first interconnect via a plurality of paths that are different from each other.

* * * * *